(12) United States Patent
Halkyard et al.

(10) Patent No.: US 10,458,235 B2
(45) Date of Patent: Oct. 29, 2019

(54) SYSTEM FOR RECOVERING MINERALS FROM THE SEABED

(71) Applicant: Deep Reach Technology, Inc., Houston, TX (US)

(72) Inventors: John Halkyard, Houston, TX (US); Richard Petters, Seattle, WA (US); Douglas Maxwell, Arvada, CO (US); Michael Rai Anderson, Houston, TX (US); Laurie Meyer, Hamilton, VA (US)

(73) Assignee: Deep Reach Technology, Inc., Houston, TX (US)

( * ) Notice: Subject to any disclaimer, the term of this patent is extended or adjusted under 35 U.S.C. 154(b) by 0 days.

(21) Appl. No.: 15/755,400

(22) PCT Filed: Aug. 25, 2016

(86) PCT No.: PCT/US2016/048675
§ 371 (c)(1),
(2) Date: Feb. 26, 2018

(87) PCT Pub. No.: WO2017/035344
PCT Pub. Date: Mar. 2, 2017

(65) Prior Publication Data
US 2018/0266074 A1    Sep. 20, 2018

Related U.S. Application Data

(60) Provisional application No. 62/209,608, filed on Aug. 25, 2015.

(51) Int. Cl.
*E21C 50/00* (2006.01)
*C22B 3/02* (2006.01)
(Continued)

(52) U.S. Cl.
CPC .............. *E21C 50/00* (2013.01); *C22B 3/02* (2013.01); *C22B 3/04* (2013.01); *C22B 3/42* (2013.01);
(Continued)

(58) Field of Classification Search
CPC ....................................................... E21C 50/00
See application file for complete search history.

(56) References Cited

U.S. PATENT DOCUMENTS 3,498,674 A * 3/1970 Matthews ............. E21B 21/015
                                                                  175/209
5,431,483 A * 7/1995 Zaiger ....................... C22B 3/04
                                                                  299/5

(Continued)

FOREIGN PATENT DOCUMENTS

CN         101629249 A       1/2010

OTHER PUBLICATIONS

Notification of international search report and written opinion of the international searching authority based on PCT/US16/4867, dated Dec. 29, 216, 13 pages.

*Primary Examiner* — Janine M Kreck
(74) *Attorney, Agent, or Firm* — Jason Saunders; Christopher McKeon; Arnold & Saunders, LLP

(57) ABSTRACT

Systems and methods for recovering and concentrating rare earth elements from seabed sediment deposits using seabed excavators and shipboard processing systems.

19 Claims, 20 Drawing Sheets

(51) Int. Cl.
- *C22B 3/04* (2006.01)
- *C22B 3/42* (2006.01)
- *C22B 59/00* (2006.01)
- *E02F 3/88* (2006.01)
- *E02F 7/00* (2006.01)
- *E02F 7/02* (2006.01)
- *E02F 7/06* (2006.01)
- *E02F 3/92* (2006.01)

(52) U.S. Cl.
CPC .............. *C22B 59/00* (2013.01); *E02F 3/885* (2013.01); *E02F 3/9243* (2013.01); *E02F 3/9262* (2013.01); *E02F 7/005* (2013.01); *E02F 7/023* (2013.01); *E02F 7/065* (2013.01); *E02F 3/925* (2013.01); *E02F 3/9256* (2013.01); *E02F 3/9281* (2013.01); *Y02P 10/234* (2015.11)

(56) References Cited

U.S. PATENT DOCUMENTS

| | | |
|---|---|---|
| 6,344,068 B1 | 2/2002 | Fleming et al. |
| 2011/0210599 A1 | 9/2011 | Patriciu |

\* cited by examiner

SYSTEM FOR RECOVERING MINERALS FROM THE SEABED

RELATED APPLICATION

This application claims priority to U.S. Provisional Application No. 62/209,608 filed Aug. 25, 2015.

TECHNICAL FIELD

The invention relates to subsea mining and/or processing.

BACKGROUND

Seabed sediment, particularly in the Pacific Ocean, has recently been identified as having elevated concentrations of rare earth elements. See, Kato, Y., Fujinaga, Y., Nakamura, K., Takaya, Y., Kitamura, K., Ohta, J., Toda, R., Nakashima, T., and Iwamori, V., 2011; Deep-sea mud in the Pacific Ocean as a potential resource for rare-earth elements, *Nature Geoscience*, 4, 535-539, incorporated herein by reference. Indications are that the seabed sediments may be leached with a weak HCl of H2SO4 acidic solution. Once in solution the rare earth elements may potentially be recovered by a process of ion-exchange, then rare earth oxides may be formed by precipitation. Economic and engineering studies on the commercial recovery of the rare earth elements are limited and have mixed conclusions. See, Tetsuo Yamazaki, Yuta Yamamoto, Naoki Nakatani and Rei Arai, 2014, Preliminary Economic Evaluation of Deep-Sea REE Mud Mining, ASML: 2014 33rd International Conference on Ocean, Offshore and Arctic Engineering OMAE2014-23141, incorporated herein by reference. Yamazaki proposed recovery of the sediment to a production support vessel followed by decanting and drying of the sediment for transfer to an onshore acid leach plant. Bashir et al proposed performing all the processing on the seabed. See, M Bashir, S H Kim, E Kiosidou, H Wolgamot, W Zhang, 2012, A Concept for Seabed Rare Earth Mining in the Eastern South Pacific, The Lloyd's Register Education Trust (LRET) Collegium 2012 Series, Volume 1, incorporated herein by reference. Yamazaki's economic assessment resulted in a negative internal rate of return based on 2012 REE prices and an assumed distribution of elements from samples taken in the Japanese exclusive economic zone. Bashir et al estimated costs for a 2000 tpy REE operation of CAPEX=$186 MM and OPEX of $61 MM/year. An internal rate of return was not computed but a range of NPVs were computed for different discount rates and different revenues based on low, present, and high average prices. Using a nominal rare earth element value of $80/kg an internal rate of return of 39% would be computed for the Bashir et al costs. On this basis seabed mining of the sediments would be economic. However, operation of a process on the seabed is not possible given the current state-of-the-art and is very risky.

The present invention is based upon processing of the sediment on board the production vessel to produce a mixed rare earth product. Economic studies have indicated this could be a superior approach in terms of return and lower risk than either of the methods described above.

A rare earth element (REE) or rare earth metal (REM), as defined by the International Union of Pure and Applied Chemistry, is one of a set of seventeen chemical elements in the periodic table, specifically the fifteen lanthanides, as well as scandium and yttrium. Scandium and yttrium are considered rare earth elements because they tend to occur in the same ore deposits as the lanthanides and exhibit similar chemical properties. Rare earth elements are commonly categorized as "light" or "heavy" rare earths based on their atomic weight (LREE and HREE respectively). An additional category of "critical" rare earths (CREE) has been added by the U S Department of Defense to identify those of strategic importance to the defense industry. A final category is "essential" rare earth elements (FREE) which consist of all the elements including scandium and yttrium, but excluding relatively low value lanthanum, cerium, and praseodymium. Table 1 shows the categories of rare earth elements.

TABLE 1

| Categorization of rare earth elements | | | | | |
|---|---|---|---|---|---|
| Atomic Weight | Symbol | LREE | HREE | CREE | EREE |
| 21 | Sc | ✓ | | | ✓ |
| 39 | Y | | ✓ | ✓ | ✓ |
| 57 | La | ✓ | | | |
| 58 | Ce | ✓ | | | |
| 59 | Pr | ✓ | | ✓ | |
| 60 | Nd | ✓ | | ✓ | ✓ |
| 61 | Pm | ✓ | | | ✓ |
| 62 | Sm | ✓ | | | ✓ |
| 63 | Eu | ✓ | | ✓ | ✓ |
| 64 | Gd | ✓ | | | ✓ |
| 65 | Tb | | ✓ | ✓ | ✓ |
| 66 | Dy | | ✓ | ✓ | ✓ |
| 67 | Ho | | ✓ | | ✓ |
| 68 | Er | | ✓ | | ✓ |
| 69 | Tm | | ✓ | | ✓ |
| 70 | Yb | | ✓ | | ✓ |
| 71 | Lu | | ✓ | | ✓ |

There is no evidence of serious exploration of the seabed for a REE resource Kato et al analyzed a number of existing core samples. Good REF grades were found across the Pacific Ocean, especially in the South East Pacific. Anything above 1000 ppm would be considered significant. Higher REE concentrations in the upper five meters of the sediment, makes extraction of the rare earth elements easier.

Current REE samples are not close enough together to make any definitive resource estimate, but simply because of the number of samples with high concentrations and the vast area of the oceans it could be speculated that the quantity of rare earth elements available for mining would be lame.

While the overall grade of oceanic rare earth elements deposits is relatively low compared to some terrestrial deposits, there is a relatively high proportion of essential rare earth elements to total rare earth elements in the oceanic deposits. Higher ratios of essential rare earth elements mean that the processing and extraction of the rare earth elements is more efficient.

Additionally, oceanic REE deposits tend to have less radioactive products such as thorium and uranium which present formidable environmental challenges in mining of other rare earth deposits. Preliminary engineering and economic studies indicate that recovery of rare earth elements from seabed sediments may be economic.

SUMMARY OF INVENTION

Systems and methods for recovering rare earth elements from the seabed are presented here. Exemplary steps are:
1. Bulk removal of sediment from the seafloor
2. Distribution of overburden sediment, if necessary, to a disposal site
3. Creation of an ore slurry with suitable concentration for lifting to the surface 4. Lifting of the sediment to the surface as an ore slurry
5. Dewatering of the ore slurry and dilution to an optimal concentration for leaching
6. Extraction of Rare Earth and other Elements by acid leach, ion exchange and precipitation of rare earth oxides on the surface vessel
7. Separation of the solids and liquid of the leachate
8. Recycling of the acidic liquid in the leach cycle
9. Reslurrying and neutralization of the recovered solids
10. Return of the solids slurry to the sea Other exemplary steps are:
1. Generating an ore slurry from the seabed with an excavator
2. Lifting the ore slurry to a surface vessel using a riser and lift pumps or an air lift
3. Preparing feed stock from the ore slurry by screening the ore slurry by size and dewatering and/or diluting to produce prepared ore slurry having solid particles in a desired concentration in seawater
4. Leaching rare earth elements from the prepared ore slurry to produce pregnant leach slurry (for example through an acid leach process)
5. Recovering the rare earth elements from the pregnant leach slurry using ion exchange resin to produce loaded resin and waste material (for example a resin in pulp system)
6. Treating the waste material so that it can be returned to the environment (neutralizing acidity or alkalinity, or other processes)
7. Stripping the rare earth elements from the resin using an eluant to produce pregnant eluant and stripped resin
8. Precipitating the rare earth elements from the pregnant elaunt to produce a rare earth element oxide material and a barren eluant An exemplary system to recover rare earth elements may include:
1. An excavator on the seabed to generate ore slurry containing rare earth elements
2. A surface vessel for processing equipment
3. A lift system for conveying the ore slurry from the seabed to the surface vessel (such as liquid pumps or air lift systems in a riser)
4. A feed preparation circuit on the surface vessel for preparing feed stock from the ore slurry by screening the ore slurry by size and dewatering and/or diluting to produce prepared ore slurry having solid particles in a desired concentration in seawater
5. A leaching circuit on the surface vessel for leaching rare earth elements from the prepared ore slurry to produce pregnant leach slurry (for example through an acid leach process)
6. A recovery circuit on the surface vessel for recovering the rare earth elements from the pregnant leach slurry using ion exchange resin to produce loaded resin and waste material (for example a resin in pulp system)
7. A residue treatment circuit on the surface vessel for treating the waste material so that it can be returned to the environment (neutralizing acidity or alkalinity, or other processes)
8. A resin stripping circuit on the surface vessel for recovering the rare earth elements from the pregnant leach slurry using ion exchange resin to produce loaded resin and waste material (for example a resin in pulp system)
9. A precipitation circuit on the surface vessel for precipitating the rare earth elements from the pregnant elaunt to produce a rare earth element oxide material and a barren eluant
10. A lixiviant recycling circuit on the surface vessel for removing solid waste materials from the leach waste material to produce a barren leach solution and a thickened leach waste material In one example of the invention, sediment is removed from the seafloor in bulk and an ore slurry including rare earth elements is lifted from the seafloor to a surface vessel. At the surface vessel, the ore slurry is dewatered to an optimal concentration for leaching. Then, rare earth elements are extracted from the ore slurry by acid leach (a lixiviant). This produces a pregnant leach slurry. The rare earth elements are removed from the solution by ion exchange resin beads which are separated from the leach liquid by solid-liquid separation. The ion exchange resin can be chosen to recover any variety of or single rare earth element desired due to ore properties and economic considerations. This produces a loaded resin and a leach waste material. The rare earth elements are removed from the resin beads and returned to solution by another acid treatment (an eluant) and precipitated as a mixed rare earth oxide. The leachate with barren sediment is neutralized with a basic solution and returned to the deep sea for disposal. In another example, the solids may be removed from the leachate and the liquid may be used to regenerate acid for the leach process, reducing acid and base consumption and costs. In other examples, overburden sediment can be discharged from the active mining zone to a disposal site prior to recovering the sediment ore for processing on the ship.

An example embodiment may include a system for recovering desired materials from the seabed comprising a surface vessel, an excavator on the seabed adapted to generate an ore slurry containing a desired material from the seabed, a lift system connected to the excavator and the surface vessel, the lift system adapted to convey the ore slurry from the from the excavator to a lift system output on the surface vessel, a feed preparation circuit on the surface vessel and connected to the lift system output, the teed preparation circuit adapted to process the ore slurry to produce a prepared ore slurry consisting essentially of seawater and solid particles within a desired size range, a leaching circuit on the surface vessel and connected to the feed preparation circuit, the leaching circuit adapted to dissolve the desired material from the ore slurry using a lixiviant to produce a pregnant leach slurry, a recovery circuit on the surface vessel and connected to the leaching circuit, the recovery circuit adapted to recover the desired material from the pregnant leach slurry using an ion exchange resin to produce a loaded resin and a leach waste material, a residue treatment circuit on the surface vessel and connected to the recovery circuit, the residue treatment circuit adapted to neutralize the leach waste material, a resin stripping circuit on the surface vessel and connected to the recovery circuit, the resin stripping circuit adapted to adapted to strip the desired materials from the loaded resin using an eluant to produce a pregnant eluant and a stripped resin, a precipitation circuit on the surface vessel and connected to the resin stripping circuit, the precipitation circuit adapted to precipitate the desired material from the pregnant eluant using a precipitant to produce the desired material and a barren eluant.

An alternative embodiment may include the system for recovering desired materials from the seabed further comprising a lixiviant recycling circuit on the surface vessel and connected to the recovery circuit, in which the lixiviant recycling circuit is adapted to remove solid waste materials from the leach waste material to produce a barren leach solution and a thickened leach waste material, and where the barren leach solution is reused in the leaching circuit and the thickened waste material is fed to the residue treatment circuit. Substantially all of the stripped resin may be reused as the ion exchange resin in the recovery circuit. The feed preparation circuit may further include a dewatering circuit adapted to remove excess water and fine particulates from the prepared ore slurry. It may include a dewatering circuit on the excavator. It may also include a subsea feed preparation circuit on the excavator with the subsea feed preparation circuit adapted to process the ore slurry to produce a prepared ore slurry consisting essentially of seawater and solid particles within a desired size range.

Further alternatives to the disclosed embodiments may include a dewatering circuit on a bottom end of the lift system. It may include a subsea feed preparation circuit on the excavator, with the subsea feed preparation circuit adapted to process the ore slurry to produce a prepared ore slurry consisting essentially of seawater and solid particles within a desired size range. It may include the feed preparation circuit further comprising a phosphate recovery circuit. It may include the feed preparation circuit having rotating and vibrating screens. It may include water jets adapted to break up lumps of sediment. It may have a crusher adapted to break up lumps of sediment. It may include the feed preparation circuit having a magnetic separator. It may include a series of leaching tanks arranged so that the prepared ore solution can move from one leaching tank to the next from a first leaching tank to a last leaching tank and agitators in the series of leaching tanks.

Alternatives to the disclosed embodiments could further include the series of leaching tanks being arranged at varying heights such that the prepared ore solution flows from one leaching tank to the next by gravity. It may have the series of leaching tanks connected by pumps such that the prepared ore solution is pumped from one leaching tank to the next. The pumps may be internal to the leaching tanks or external to the leaching tanks. The leaching tanks may have baffles adapted to reduce free surface effects. The leaching tanks may have fixed tops to allow tanks to be filled in order to prevent free surface effects. The leaching tanks may have movable tops adapted to limit free surface effects by floating on the tank contents. The leaching tanks may have vent pipes to limit over-pressurization of the tanks when full.

Additional alternatives to the disclosed embodiment may include the lixiviant being added to the first leaching tank. The lixiviant may be added to a plurality of the series of leaching tanks. The lixiviant may be a mineral acid, an organic acid, or a combination of a mineral acid and an organic acid. The ion exchange resin may include resin beads larger than the substantially all of the particles in the pregnant leach slurry. The recovery circuit may have a series of resin contact tanks arranged so that the pregnant leach slurry can move from one resin contact tank to the next from a first resin contact tank to a last resin contact tank and agitators in the series of resin contact tanks. The recovery circuit may have a resin in pulp system, a resin in leach system, or a resin in column system. The pregnant leach slurry and ion exchange resin may be in counter-current contact. The loaded resin and leach waste material may be mechanically separated. The loaded resin and leach waste material may be separated using a screen.

An alternative embodiment may include the system for recovering desired materials from the seabed in which the residue treatment circuit having a series of residue treatment tanks arranged so that the leach waste material can move from one residue treatment tank to the next from a first residue treatment tank to a last residue treatment tank, a residue treatment injector adapted to add a residue treatment agent to the series of residue treatment tanks, and agitators in the series of residue treatment tanks. The series of residue treatment tanks may be arranged at varying heights such that the leach waste material flows from one residue treatment tank to the next by gravity. The series of residue treatment tanks may be connected by pumps such that the leach waste material is pumped from one residue treatment tank to the next. The resin stripping circuit may have a series of stripping tanks arranged so that the eluant can move from one stripping tank to the next from a first stripping tank to a last stripping tank, and agitators may be in the series of stripping tanks. The precipitation circuit may have an agitated precipitation tank. The precipitation circuit may have a dewatering system to separate the desired material from the barren eluant. The dewatering system may include a filter press. The precipitant may be oxalic acid. The precipitant may be sodium carbonate.

Further example alternative embodiments may include a bulk bagging system connected to the precipitation circuit and the bulk bagging system adapted to bag the desired materials for transport. The lift system may include a riser. The lift system may include a submersible pump. The lift system may have an air lift. The riser may include a rigid pipe. The riser may include a flexible pipe. The riser may have a rigid pipe and a flexible pipe connected together. The surface vessel may be dynamically positioned relative to the seabed. The excavator may have a suction head. The excavator may have a cutter suction head. The excavator may have water jets proximate to the suction head. The excavator may be negatively buoyant and supported by the seafloor. The excavator may be towed by the surface vessel using the riser. The excavator may include an adjustable rudder adapted to provide steering forces on the excavator. The excavator may have an adjustable tow point adapted to provide steering forces on the excavator. The excavator may have a steering thruster. It may have a sweeping suction head arm. It may have a sweeping and extending suction head arm. The excavator may have an auger. The suction for the suction head may be provided by the lift system. The excavator may have a hood for directing sediment into the suction head. It may have a negatively buoyant excavator suspended from the surface by a suspension system. The suspension system may control the vertical position of the excavator relative to the seafloor.

Additional alternative embodiments may include the system for recovering desired materials from the seabed in which the excavator includes a body, a flexible joint between the body and suction head, and a reference feature on the suction head adapted to maintain the suction head position on the seafloor. The reference feature may have a floor plate and/or skids. The excavator may be supported on the seafloor and propelled by Archimedes screws. The excavator may be supported on the seafloor and propelled by tracks. The excavator may be supported on the seafloor by skids and propelled by thrusters. The excavator may be a neutrally buoyant excavator positioned vertically and horizontally using thrusters. An umbilical may be used to connect between the surface vessel and the excavator. The umbilical connection may include a power and data umbilical deployed from the surface vessel. The lift system may include a flexible jumper hose connecting the excavator to a bottom end of the riser. The jumper hose may have alternating positively and negatively buoyant sections. The lift system may include a collection point connected between the jumper hose and riser. The lift system may have a booster pump proximate the collection point. The embodiment may include an overburden discharge hose extending from the collection point to a spoils discharge zone on the seabed. It may include the excavator having a plurality of excavators. It may include a riser connected to the surface vessel at a top end and a jumper hose connecting each of the plurality of excavators to the bottom end of the riser. The excavator may include a plurality of excavators can be positioned independently relative to the seabed. It may have a discharge system connected to the residue treatment circuit with the discharge system adapted to discharge the leach waste material into the sea. The discharge system may include a mid-water discharge outlet. The waste discharge hose may be connected to the excavator and the waste discharge hose may be adapted to discharge waste from the excavator to a spoils zone on the seabed.

An example embodiment may include a method of recovering desired materials from the seabed including the steps of generating an ore slurry containing a desired material from the seabed, conveying the ore slurry to a surface vessel, processing the ore slurry to produce a prepared ore slurry consisting essentially of seawater and solid particles within a desired size range, leaching the desired material from the prepared ore slurry using a lixiviant to produce a pregnant leach slurry, recovering the desired material from the pregnant leach slurry using an ion exchange resin to produce a loaded resin and a leach waste material, neutralizing the leach waste material by adding a residue treatment agent, stripping the desired materials from the resin using an eluant to produce a pregnant eluant and a stripped resin, and precipitating the desired material from the pregnant eluant using a precipitant. Alternatives may include removing solid waste materials from the leach waste material to produce a barren leach solution and a thickened leach waste material and reusing the barren leach solution as at least a portion of the lixiviant for leaching. It may recover desired materials from the seabed including reusing the barren leach solution as the majority of the lixiviant for leaching. It may recover desired materials from the seabed including reusing substantially all of the stripped resin as the ion exchange resin for recovering. The method embodiment may include recovering desired materials from the seabed in which the generating of an ore slurry further includes dewatering the slurry proximate an excavator on the seabed. The generating of an ore slurry may further include processing on the excavator to produce an initially prepared ore slurry consisting essentially of seawater and solid particles within a desired size range. The generating of an ore slurry may include dewatering the slurry on a bottom end of the lift system. The generating of an ore slurry may include processing on a bottom end of the lift system to produce an initially prepared ore slurry consisting essentially of seawater and solid particles within a desired size range. The feed preparation circuit may include a phosphate recovery circuit. The processing of the ore slurry may include dewatering the ore slurry to remove excess water and fine particulates from the prepared ore slurry. The processing of the ore slurry may include breaking up lumps of sediment in the ore slurry. It may include magnetically separating tramp ferrous metals from the ore slurry. It may include flowing the prepared ore slurry through a series of leaching tanks from a first leaching tank to a last leaching tank and agitating the ore slurry and lixiviant in the series of leaching tanks. The prepared ore slurry may flow from one leaching tank to the next by gravity. The prepared ore slurry may flow from one leaching tank to the next by pumping. The embodiment may include floating the tops of the leaching tanks on the tank contents to limit free surface effects. It may include adding the lixiviant to the first leaching tank. It may further include adding the lixiviant to a plurality of the series of leaching tanks. The embodiment may include the step of recovering desired materials from the seabed in which the lixiviant is a mineral acid, an organic acid, an ammonium salt, a combination of a mineral acid and an organic acid, a combination of a mineral acid and an ammonium salt, or a combination of a mineral acid, an organic acid and an ammonium salt. The ion exchange resin may include resin beads larger than substantially all of the ore particles in the pregnant leach slurry.

Additionally and in the alternative to the method embodiments disclosed, the recovering step may include a resin in pulp process, a resin in leach process, or a resin in column process. The recovering step may include flowing the pregnant leach slurry through a series of resin contact tanks from a first resin contact tank to a last resin contact tank and agitating the pregnant leach slurry and resin in the series of resin contact tanks. The recovering step may include placing the pregnant leach slurry and ion exchange resin in counter-current contact. It may further include mechanically separating the loaded resin and leach waste material. The loaded resin and leach waste material may be separated using a screen.

Additional alternatives may include the neutralizing step including flowing the leach waste material through a series of residue treatment tanks from a first residue treatment tank to a last residue treatment tank, adding the residue treatment agent to the series of residue treatment tanks, and agitating the leach waste material in the series of residue treatment tanks. The leach waste material may flow from one residue treatment tank to the next by gravity or by pumping. The neutralizing step may further include introducing a flocculant to the leach waste material.

The stripping step disclosed herein may include placing the loaded resin into a series of stripping tanks and flowing the eluant through the series of stripping tanks from the last stripping tank to the first stripping tank. The precipitating step may include an agitated precipitation tank. The precipitating step may include dewatering to separate the desired material from the barren eluant. The dewatering may be performed by a filter press. The precipitant may be oxalic acid, sodium carbonate, sodium bicarbonate, or sodium hydroxide. The embodiment may include bulk bagging the desired materials for transport. It may include generating the ore slurry with an excavator.

Alternatives to the embodiments disclosed may include dynamically positioning the surface vessel. Further it may include dynamically positioning the surface vessel relative to the seabed. It could include dynamically positioning the surface vessel relative to a moving point on the seabed. It could include dynamically positioning the surface vessel relative to the excavator. The embodiment may include maintaining the surface vessel within a prescribed watch circle. It may include maintaining the surface vessel within a prescribed watch circle relative to the seabed, relative to the excavator, and/or relative to a moving point on the seabed. It may include maintaining the surface vessel within a prescribed watch circle relative to the excavator. The embodiment may include towing the excavator by movement of the surface vessel or by movement of the surface vessel through a riser. It may include steering the excavator using a rudder and/or steering the excavator by adjusting a tow point on the excavator. It may include reducing friction between the excavator and the seabed using idler tracks. It may include powering the idler tracks to match a desired speed of the excavator relative to the seabed. It may include generating the ore slurry by agitating seabed sediments. The seabed sediments may be agitated by a water jet and/or a mechanical cutter head. The embodiment may include generating the ore slurry with an excavator having a cutter head and water jets agitating seabed sediment proximate a suction head. It may include conveying the ore slurry to a surface vessel using a riser having a top end affixed to the surface vessel. It may include conveying the ore slurry from the excavator to the riser using a jumper hose.

Alternatives and additions to the disclosed embodiments may include generating the ore slurry with a plurality of independent excavators, conveying the ore slurry from the plurality of excavators to the surface vessel using a riser having a top end affixed to the surface vessel and a bottom end, and conveying the ore slurry from the plurality of excavators to the to the bottom end of the riser using a corresponding plurality of jumper hoses. The alternatives may include controlling the excavator from the surface through an umbilical. It may include providing power to the excavator from the surface through the umbilical. Controlling the excavator may include controlling the excavator's path on the seabed. Controlling the excavator may include controlling the excavator's generation of the ore slurry. The excavator may be negatively buoyant and supported by the seabed. It may include supporting the excavator on and propelling the excavator along the seabed using Archimedes screws. It may include supporting the excavator on and propelling the excavator along the seabed using tracks. The excavator may have a negatively buoyant excavator suspended from the surface by a suspension system. The suspension system may control the vertical position of the excavator relative to the seafloor. The excavator may be a neutrally buoyant excavator positioned vertically and horizontally using thrusters. The embodiment may further include discharging the leach waste material in mid-water. It can discharge the leach waste material in a previously excavated area. It may include generating an overburden slurry using an excavator and discharging the overburden slurry in a spoils zone.

DESCRIPTION OF EMBODIMENTS

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

In most examples of the invention seabed sediments are removed in bulk and lifted to the surface. Typically, the sediment is lifted to the surface using a riser and lift system. The lift system would include a conduit (riser) for passing a slurry containing the sediment and water, and a pump or other means of providing power to raise the slurry to the surface. This allows the rare earth elements to be extracted from the sediment on the surface. A special production vessel may be modified at the surface to recover the minerals from the sediment. The barren sediment with the minerals removed and suitably treated to remove contaminants to may then be returned in a separate conduit to a location at or near the seabed for disposal.

A number of methods and apparatus for bulk sediment removal can be used to provide mineral rich sediment to the riser and lift system or seafloor processing facility. In some examples, non-mineral bearing sediment (overburden) may be removed and transferred via a midwater suspended hose to a disposal site. This same method may be used to a subsea processing site.

Figure 1:
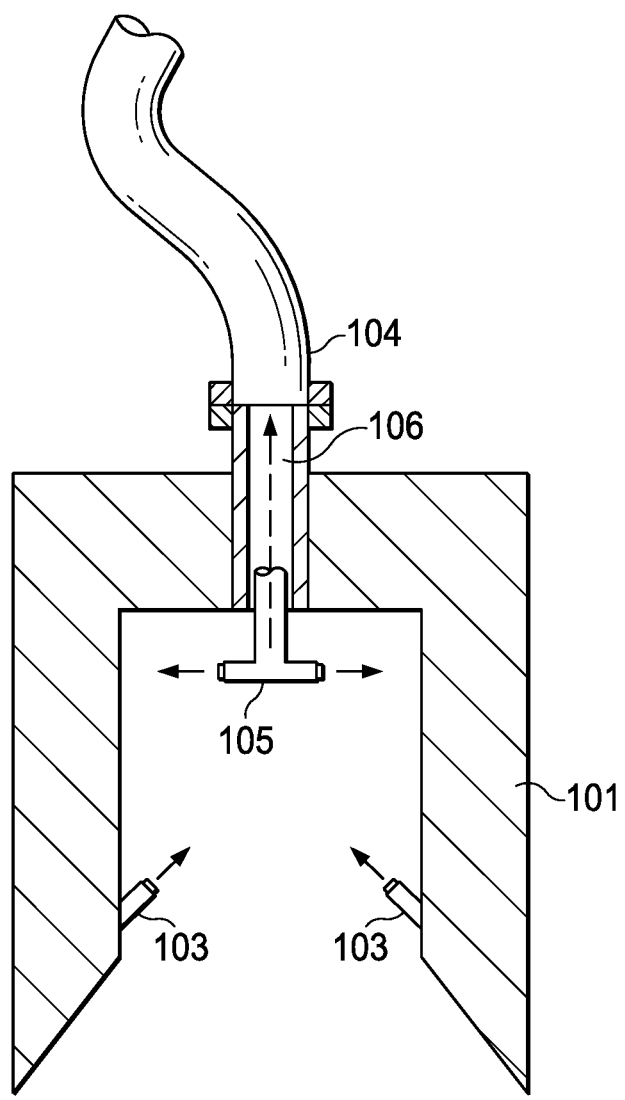
FIG. 1 is a cross-section of a suction caisson excavator.

In one example embodiment, a caisson is used to effect the bulk removal of sediment as shown in FIG. 1. The caisson may be a suction caisson 101 which is forced into the sediment by reduction of the internal pressure by external pumps so that the hydrostatic pressure forces the caisson 101 into the soil. Internal jets 103 supplied with high pressure water fluidize the internal sediment. The sediment is extracted by a central chamber 106 which is connected to the suction end 104 of a lift system. An optional rotating nozzle 105 may be used to assist in the fluidization of the sediment. By placing additional internal jets near the center of the caisson, outside excavation diameters in excess of 4 m may be achieved.

In another example embodiment, a towed dredge is used to affect the bulk removal of sediment. The towed dredge head example depicted in FIG. 2 combines a production vessel 201 on the surface towing a riser and lift system 202 consisting of a lift riser or conduit 203, lift pumps 204, to provide power for raising the slurry, and a discharge riser or conduit 205, to convey processed sediment and seawater to a position near the sea floor for disposal. The riser and lift system 202 is suspended through a moon pool 206 at the surface vessel. The bottom of the riser and lift system is attached to a flexible juniper hose 207, which provides the towing force to the towed suction head 208 and also conveys the ore slurry from the suction head 208 to the riser and lift system 202. In some examples the towed suction head 208 has skids 302 for supporting the weight of the suction head 208 a drag head and bypass valves for allowing flow into the flexible pipe in the event of a blockage of the drag heads. In its simplest form the suction head 208 may have no moving parts. The ore slurry conveyance is provided by riser lift pumps 204 and no separate pump is required on the suction head 208. Lift pumps 204 can be located and distributed in the upper sections of the riser 203. The system could be deployed with a dredge head 208 on the seabed 209, jumper hose 207, and then elements of riser 203 continuing to the surface. A discharge pipe 205 conveys sediment and water waste for disposal near the sea bed 209.

Figure 3A:
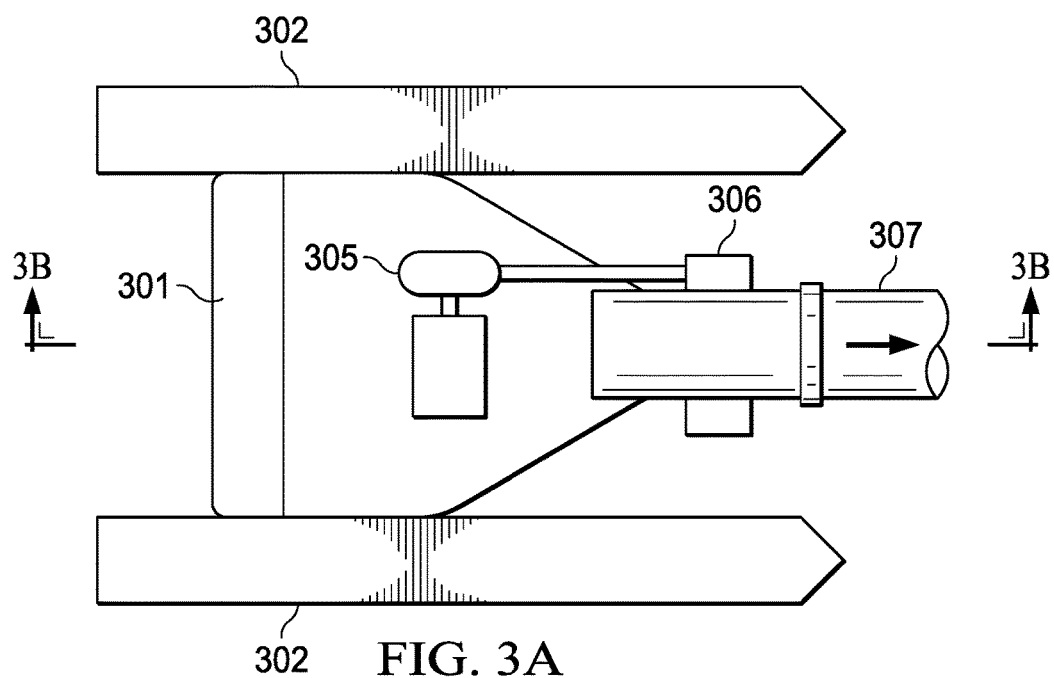
FIG. 3A is a top view of a drag head with skids.
Figure 3B:
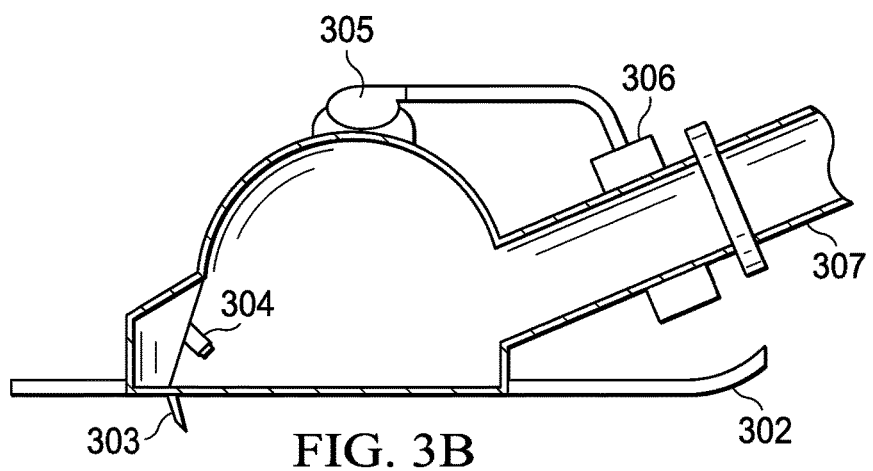
FIG. 3B is a cross-section view of the drag head in FIG. 3A.

Other examples may have means for controlling the solid to water mixture and jets or mechanical devices for liquefying seabed material for pick up. One example of this is shown in FIGS. 3A and 3B. A drag head 301, is positioned between skids 302. The drag head includes teeth 303 and optional jetting nozzles 304 for loosening consolidated seabed sediment. One or more pumps 305 mounted on the drag head 301 provide high pressure water to the nozzles 304. A pump 305 also mounted on the towed suction head 301 provides high pressure water to educators 306 in the discharge pipe 307 to provide the suction force to boost the flow of sediment and water to the riser and lift system 202. This example provides more positive control over the flow of slurry into the riser and lift system 202.

Figure 4A:
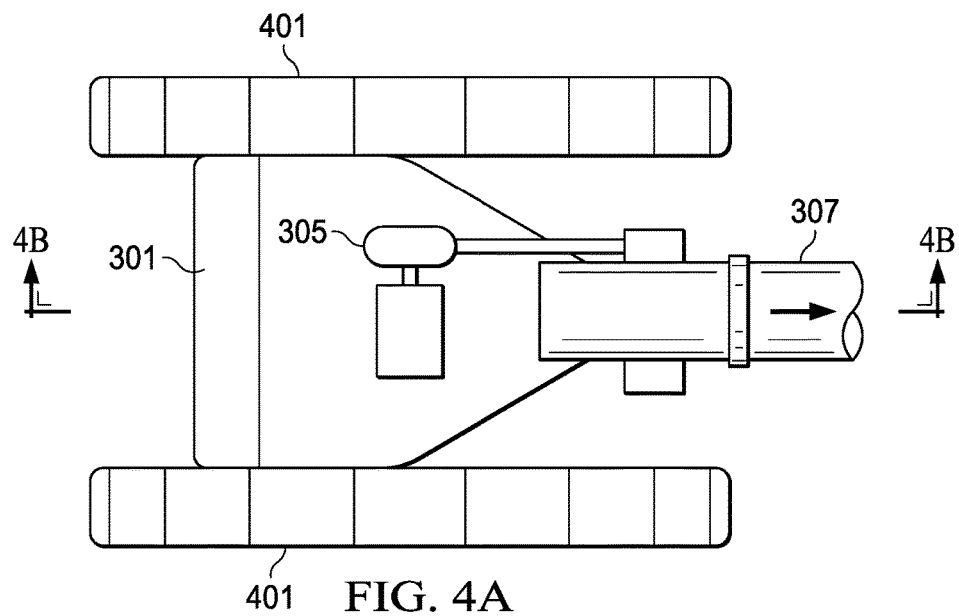
FIG. 4A is a top view of a drag head with tracks.
Figure 4B:
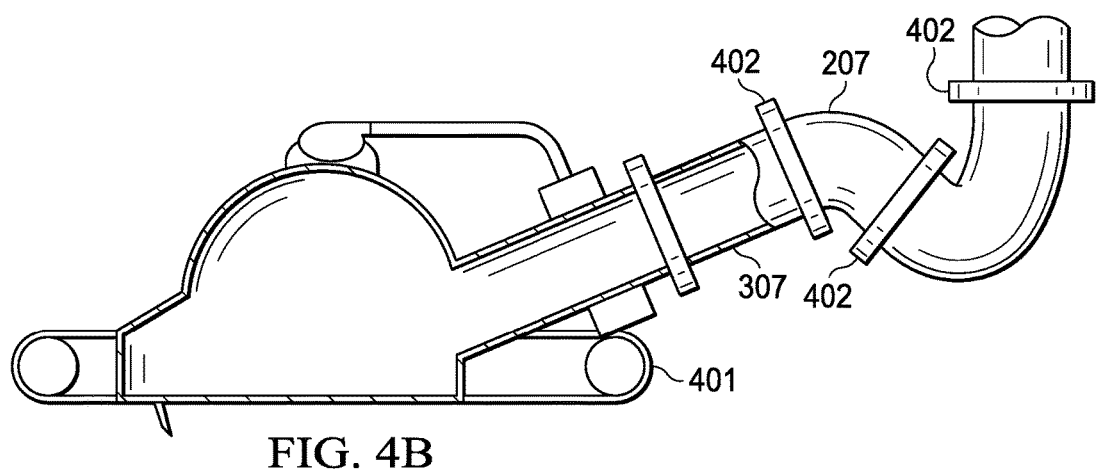
FIG. 4B is a cross-section view of the drag head in FIG. 4A.

Skis or skids 302 are the simplest means of support for towed systems. However, in very deep water the trajectory of the towed vehicle can be difficult to control. Another example is shown in FIGS. 4A and 4B. This embodiment would employ a robotic vehicle supported, for example, on tracks 401 to allow for maneuvering on the seabed by differential speed control of the tracks. In this example, the flexible jumper hose 207 used to propel the towed suction head, 3-1 is replaced by a flexible jumper hose 207, which conveys the slurry from the robotic, self-propelled suction head 301 to the riser and lift system 202. This flexible hose does not convey a towing force between the riser and lift system and the suction head. Its shape is maintained by distributed buoyancy modules 402 which cause the flexible hose 207 to take the shape of a wave which allows for relative motion between the bottom of the riser and lift system 202 and the track supported suction head 301.

Figure 2:
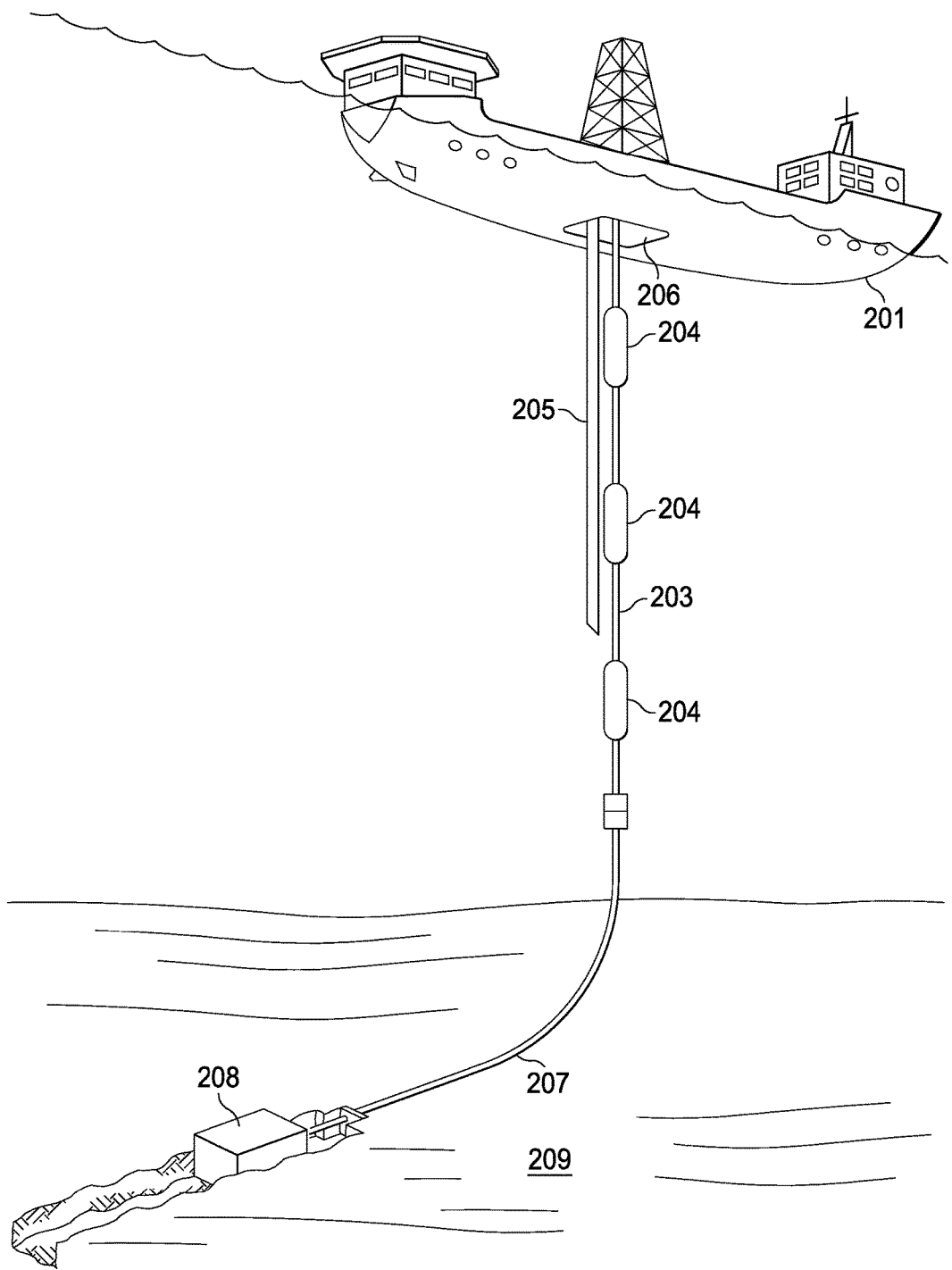
FIG. 2 is a perspective drawing of a towed dredge head system.

Another embodiment of the tracked vehicle may consist of a towing mechanism as shown in FIG. 2. In this case primary propulsion forces are provided by the surface vessel, however the tracks 401 are utilized to control the motion of the vehicle. For example, unsteady stick-slip behavior may be mitigated by allowing the tracks to eliminate the difference between the static and dynamic friction of the soil. This may be done using unpowered idler tracks, or by driving the tracks at the desired speed of the excavator across the seabed.

Figure 5:
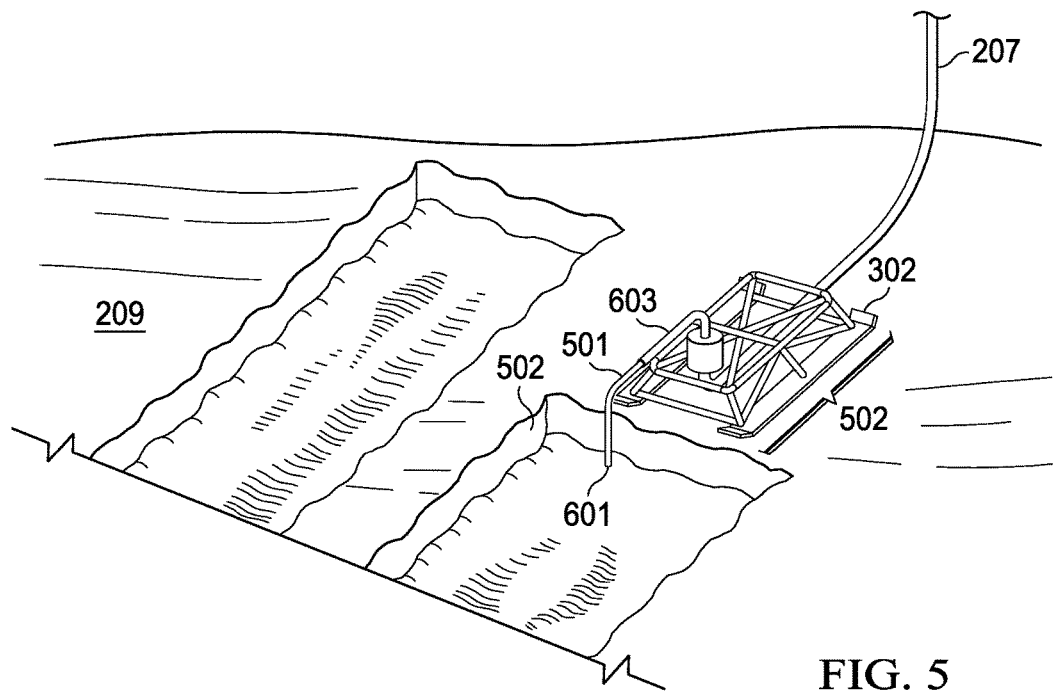
FIG. 5 is a perspective drawing of a towed dredge head with a sweeping trailing suction boom.
Figure 6:
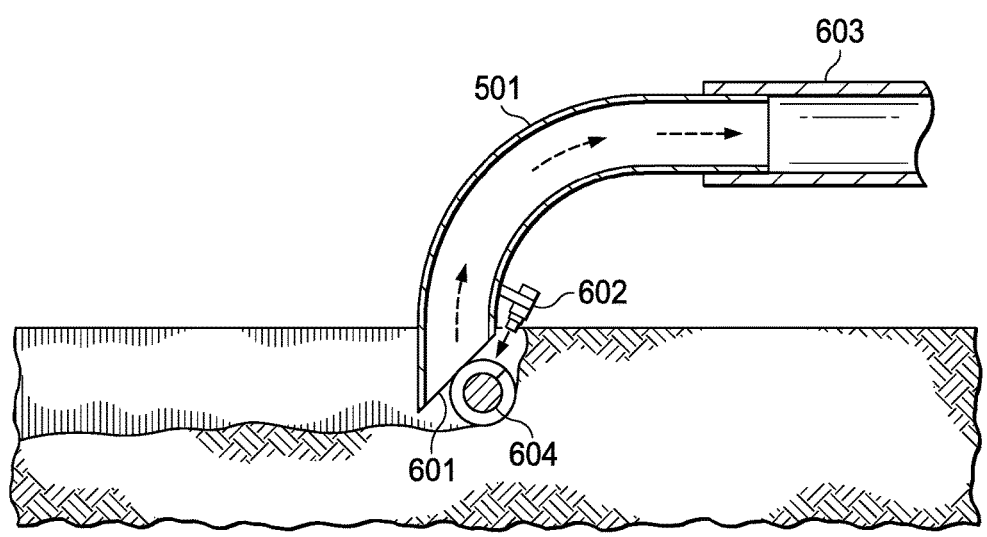
FIG. 6 is a cross section drawing of a sweeping trailing suction boom.

In a further example embodiment as shown in FIG. 5 a suction boom 501 is used for bulk removal of the seabed sediment and generating the ore slurry. The suction boom 501 is extended and retracted from the vehicle 502 to maintain engagement with a sediment bank on the seabed 209. The suction boom 501 is swept back and forth across the sediment bank to remove the sediment, generating the ore slurry. FIG. 6 shows an example sweeping trailer suction boom 501. At the end of a sweep the suction boom 501 is retracted to pull (or push) the suction intake 601 into the sediment bank 502. The suction intake 601, or bonnet, is reoriented to favor the new sweep direction. The orientation of the water jets 602 is also adjusted or a new set of jets is engaged to favor the new sweep direction. The forward speed of the vehicle 502 remains unchanged or minimally altered during this process. Then, the sweep direction of pivot boom 603 is reversed. As the pivot boom 603 is swept in its new direction the suction boom 501 is extended to optimize/maximize recovery of material as the vehicle 502 continues to move forward. When the suction boom 501 gets to the end of its sweep, these steps are repeated to continue excavating the seabed sediments. The suction boom 501 could also be mounted on the front of the vehicle 502, or a suction boom could be mounted on both the front and back of the vehicle 502. For a forward projecting boom the extension and retraction procedures are reversed. In some examples, the intake head 601 at the end of the suction boom 501 is fitted with features to assist with the dislodging of seafloor sediments so that sediment can be more easily drawn into and lifted to the surface via the riser and lift system. FIG. 6 shows how some of these features, water jets 602 and mechanical augers 604 can be placed on the suction intake 601. Depending upon the type of sediment being excavated, the suction intake could be fitted with any combination or orientation of these features. In certain soil types the suction boom may be fitted with a rotary cutter head with optional water jets. In other examples the surface vessel or platform does not tow the suction head, but instead remains stationary or in a desired position or watch circle relative to the excavator.

Figure 10:
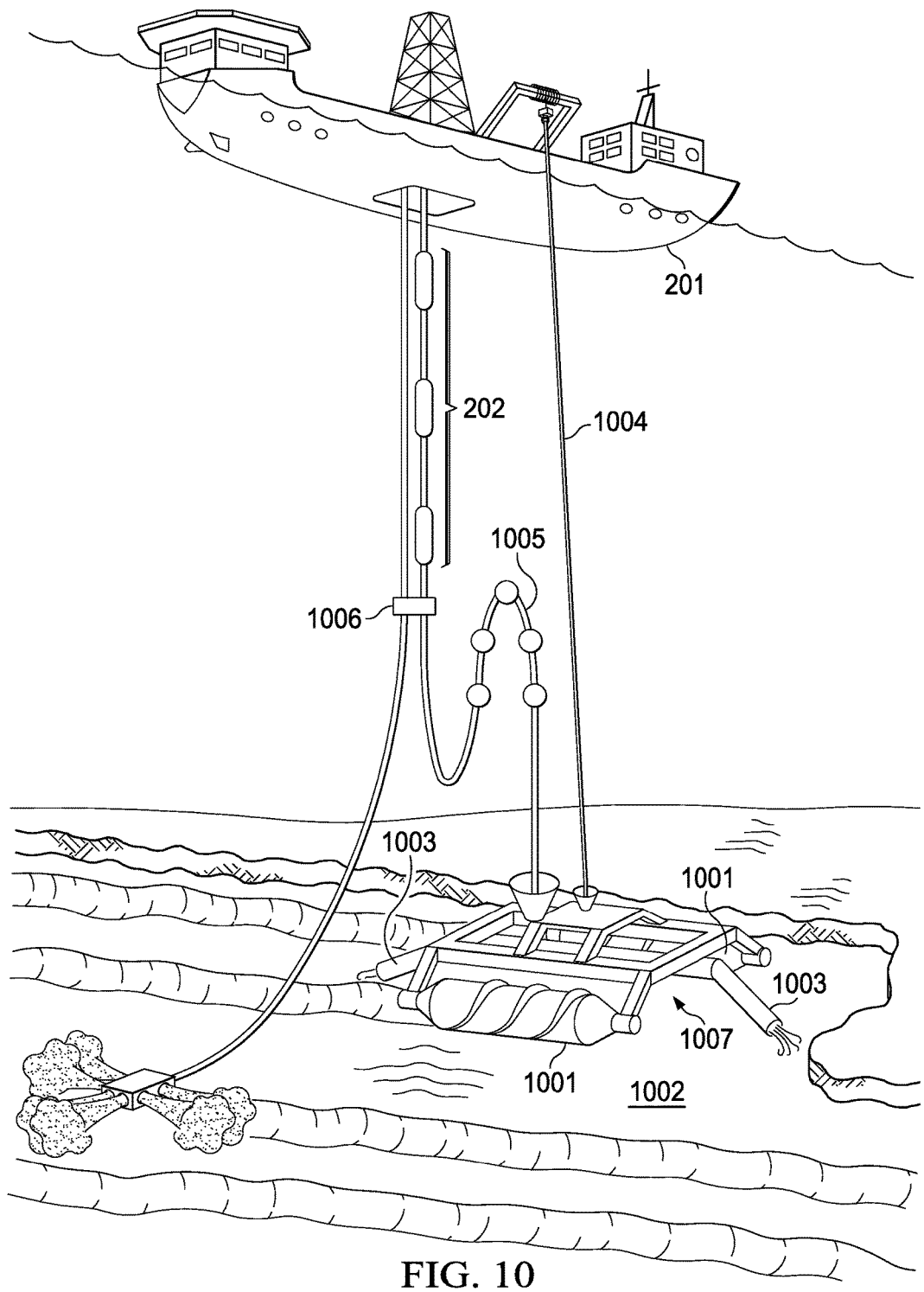
FIG. 10 is a perspective drawing of a bottom founded excavator system.

In a further example, the excavation vehicle is a negatively buoyant vehicle that propels itself along the seabed. One example of such a system is shown in FIG. 10. In this example, the excavation vehicle 1007 is propelled and positioned on the seabed with the use of Archimedes' screws 1001 engaging the seafloor 1002. Being bottom founded and more stable allows the options of using water jets, rotating suction-cutter heads, or other mechanical means for breaking up the seafloor. The suction heads 1003 may be of the rotating and extending boom type, or any other means of collecting sediment such as a bucket wheels or dustpan dredge heads for example. The suction heads 1003 can be mounted on both ends of this vehicle to allow it to reverse course without turning. The lifting line 1004 allows the vehicle to be retrieved without removing the riser pipe. The steep-wave configuration of the flexible hose 1005 between the crawler 1007 and the lower end 1006 of the riser and lift system 202 allows for variation in the horizontal and vertical position of the crawler 1007 relative to the riser and lift system 202. Alternatively, the excavation vehicle 1007 can use tracks 401 in lieu of the Archimedes screws for propulsion and positioning.

Figure 11:
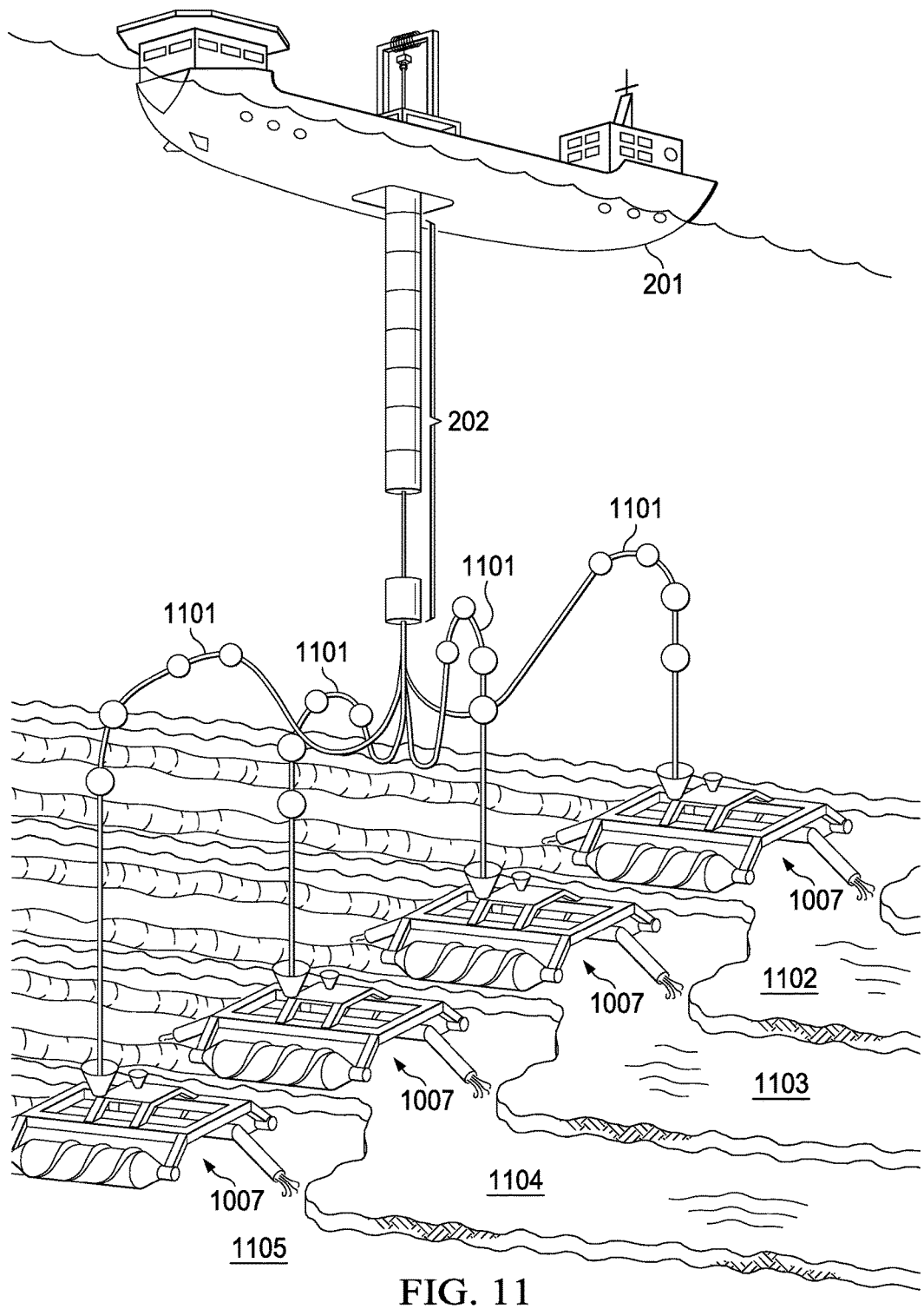
FIG. 11 is a perspective drawing of a multiple excavator system.

High production operations may require multiple seabed units to achieve production. FIG. 11 shows one example embodiment using four crawler vehicles 1007. Each vehicle is independently controlled and is connected to a common riser and lift system 202 through a flexible buoyant hose 1101. The trajectories of the four vehicles 1007 and the surface vessel 201 must be carefully controlled so as not to cause unacceptable horizontal and vertical forces on the vehicles from the flexible hoses 1101. Vehicles 1007 would be propelled with the use of either tracks, Archimedes screw drives, or thrusters. FIG. 11 shows multiple depths, or "benches" 1102-1105 being excavated. This operation could also be used, for example, to remove overburden and create a pit for accessing the high mineral content sediment which could be excavated by the crawlers or one of the remotely operated bulk sediment removal methods described above.

Other examples of seabed excavation methods do not require tracks, skis or other means for supporting the excavator on the seafloor. In the example shown in FIG. 7 a slurry pump/excavator 701 suspended from the ship 201 by a cable 708 is moved and positioned around the mine site with the use of pre-set anchors 702. Winches 703 on the pump 701 are used to adjust the length of the anchor lines 704 and position the pump 701. The ore slurry material is pumped through a riser and lift system 202 to the surface vessel 201 for processing, in this example, spoils 705 are shown being disposed of on the seabed 209 in an area outside the immediate mining area. Slurry from the dredge head to the lower end 1006 of the riser and lift system 202 is conveyed in a flexible hose 706. The hose 706 is maintained in the configuration of a "steep wave" by placing buoyancy elements 707 at certain points along its length. This allows the vertical and horizontal position of the dredge 701 to change relative to the lower end 1006 of the riser and lift system 202 without exerting undo forces on either the slurry pump 701 or the riser and lift system 202.

Figure 7:
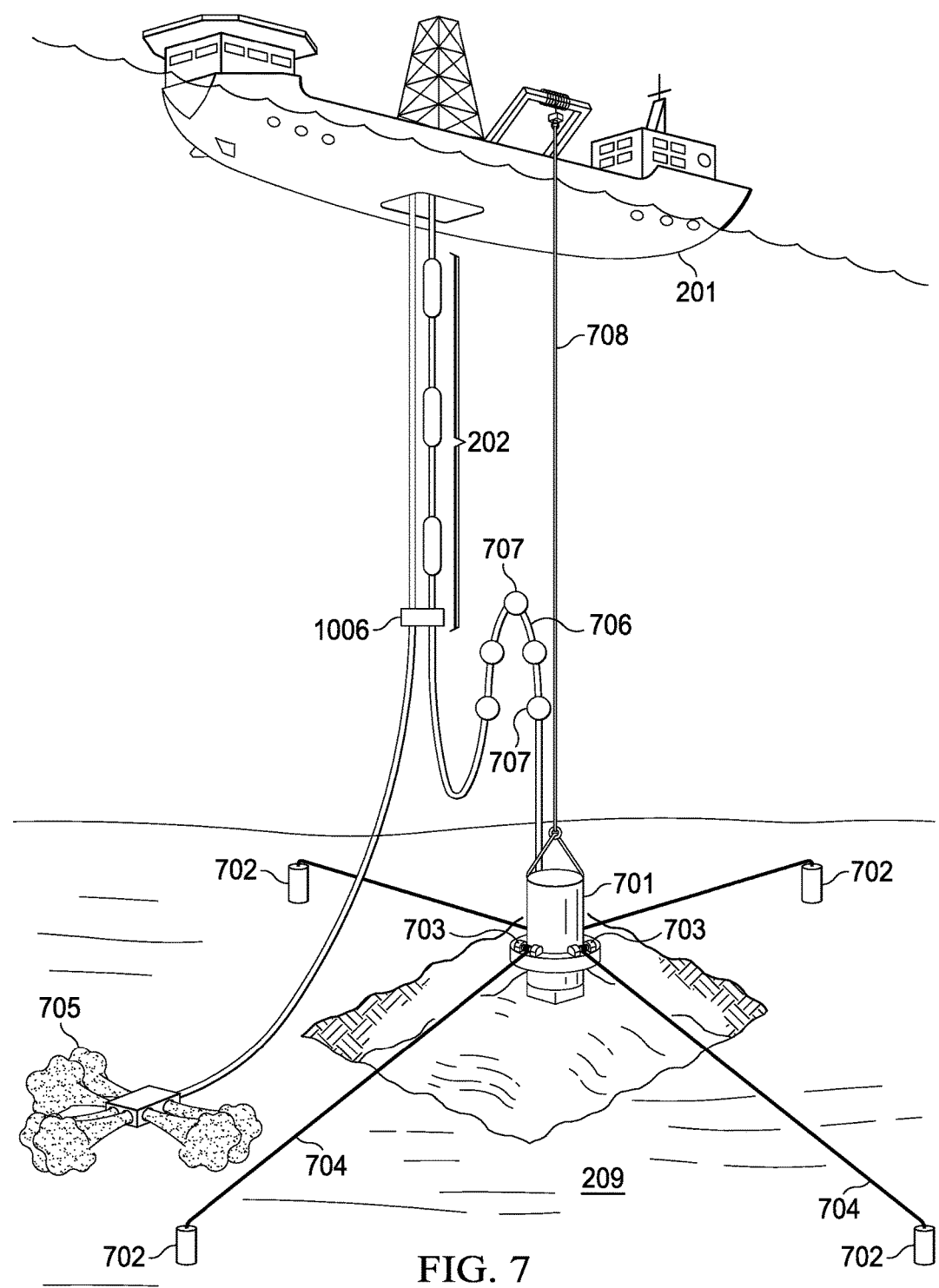
FIG. 7 is a perspective drawing of a suspended and anchored excavator system.
Figure 8:
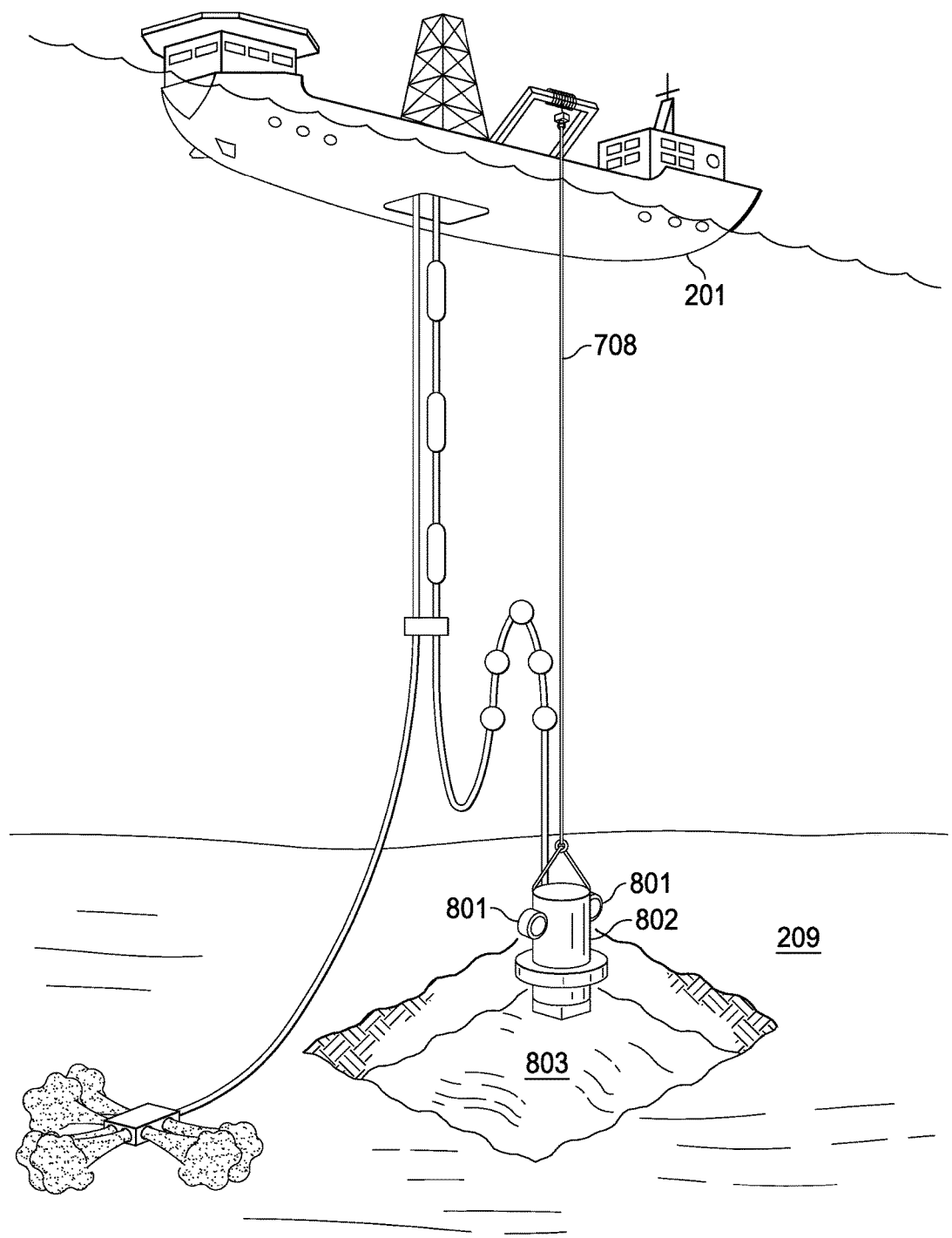
FIG. 8 is a perspective drawing of a suspended excavator system.

Another embodiment shown in FIG. 8 shows a similar example that uses thrusters 801 fitted to the suspended pump/excavator 802. The thrusters 801 are used to move the suspended pump 802 around the mine site 803 rather than the winches and anchors shown in FIG. 7. The excavator 802 could be positively or neutrally buoyant. Positive buoyancy of the excavator could be used to offset the weight of sediment slurry in the excavator during mining operations.

In the examples shown in FIGS. 7 and 8 the weight of the submerged pump/excavator is supported by cable 708 from the surface vessel 201. The cutting depth of the pump in the seabed 209 is controlled by the extension of this cable 708 by a winch on the surface vessel 201.

Figure 9:
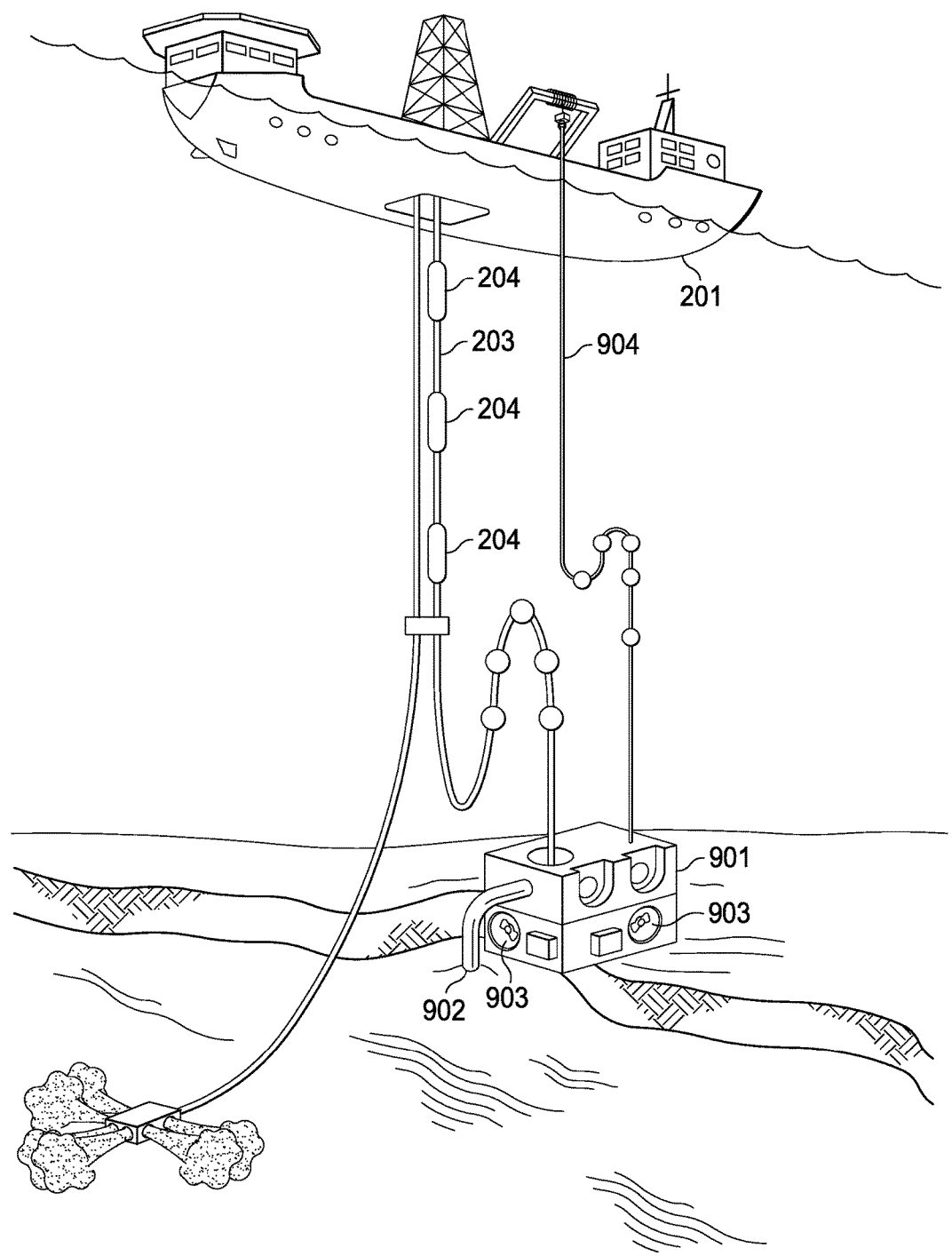
FIG. 9 is a perspective drawing of an ROV excavator system.

FIG. 9 shows a further example where a remotely operated seafloor suction vehicle (ROSSV) 901 is used to remove the seabed sediment. The ROSSV is a neutrally buoyant remotely operated vehicle which has been fitted with a suction head 902 and jetting agitators on the suction head. The slurry pumps for sediment recovery could either be integral to the vehicle or if a jumper hose capable of withstanding suction were used the riser's 203 lift pumps 204 could be used to provide the suction flow for the dredge head 902. Like the example of FIG. 8, thrusters 903 on the vehicle 901 are used to control its position and thus the feed rate of ore slurry into the flexible jumper 706 and the riser 203.

The vehicle 901 is deployed independently from the riser 203 using its own launch and recovery System (LARS). As it is free swimming, it is capable of docking and undocking itself from the end of the slurry discharge hose/jumper 706 without the need for an intervening vehicle. Power for operating the thrusters 903 and pump is provided by a separate power and data umbilical 904.

Figure 12:
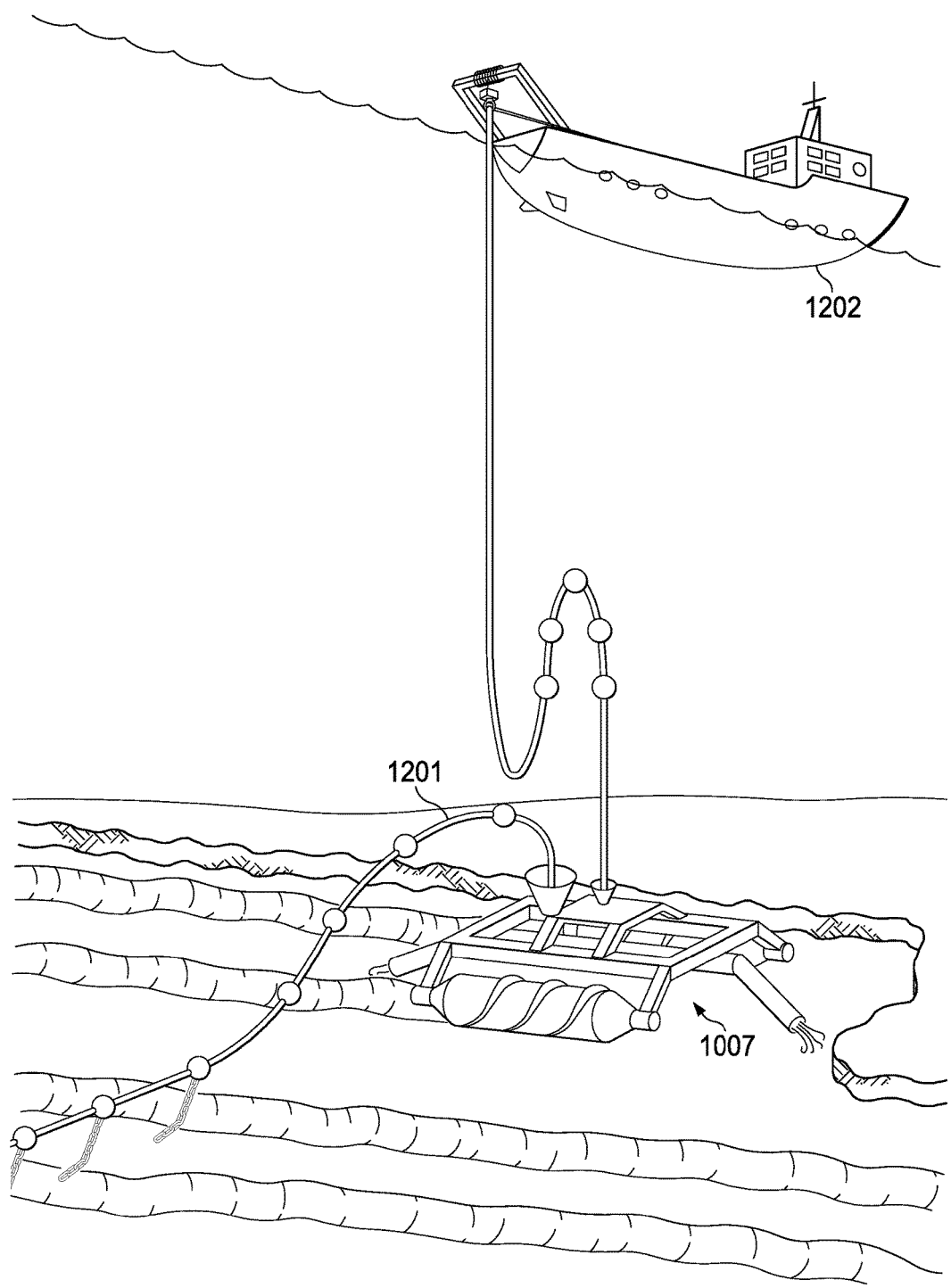
FIG. 12 is a perspective drawing of a bottom founded excavator system removing overburden material for disposal on the seabed.
Figure 13:
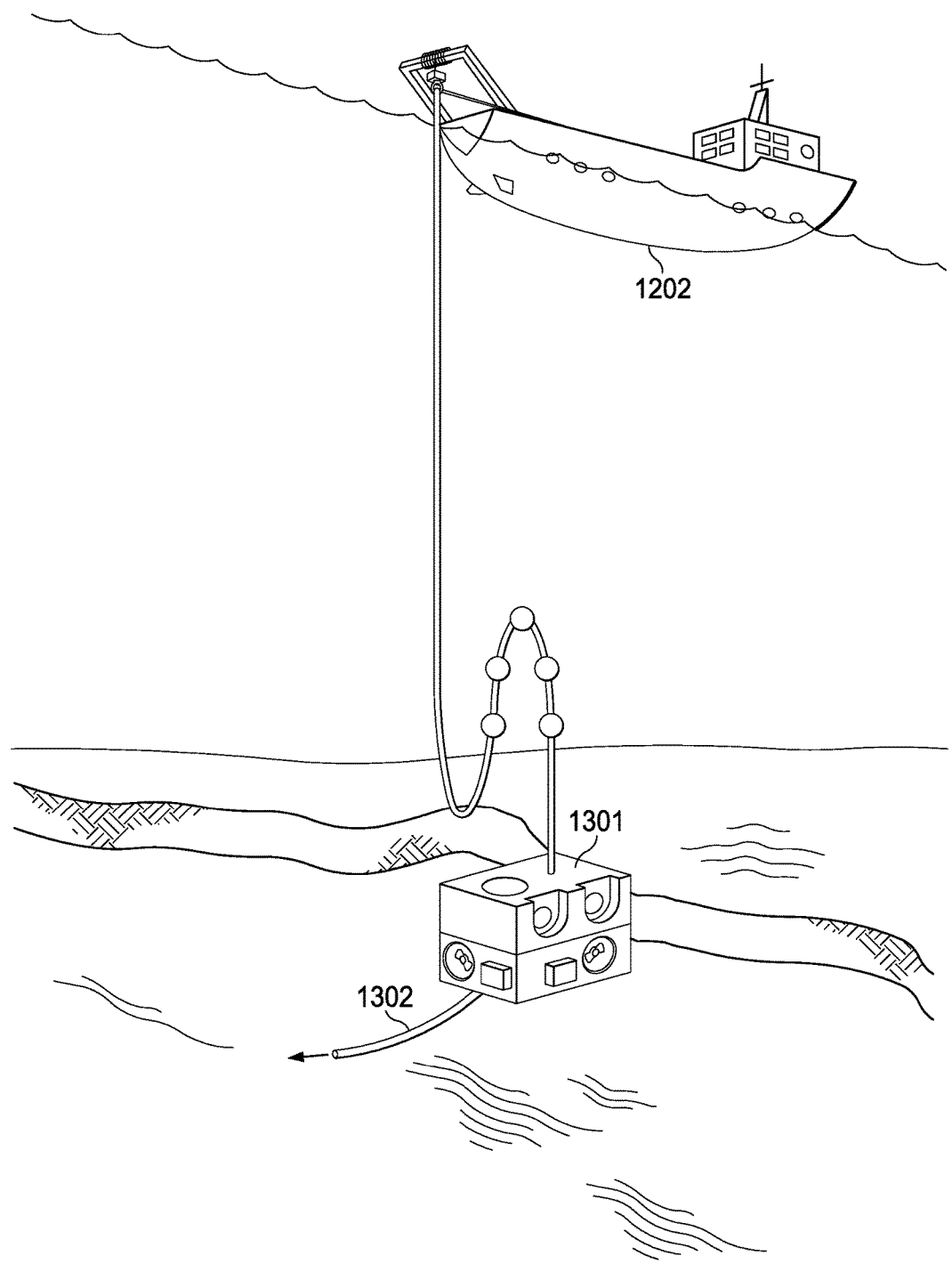
FIG. 13 is a perspective drawing of an ROV excavator system for removing overburden material for disposal on the seabed.

In a situation where the top layer of sediment consists of low grade REE over top of a higher grade REE deposit then the excavation system could be reconfigured to pump the upper layer of lower grade material to another location on the seafloor rather than to the surface. FIG. 12 shows one such example where a crawler vehicle 1007 is fitted with a discharge hose 1201 to pump the overburden material to a seafloor spoils area. Since a riser and lift system is not required this operation could be conducted from a smaller surface platform, such as a relatively small ship 1202. FIG. 13 shows another such example where a suction head ROV 1301 is fitted with a discharge hose 1302 to pump the overburden material to a seafloor spoils area. Once the overburden is removed, a mining ship with a riser and lift system would be brought to remove the sediment to the surface for processing. As the mining operation progresses, the pit left behind could be used for spoils disposal of low REE overburden material or processes spoils returned to the seabed from the mining and/or processing platform/vessel.

In certain instances, it may be desirable to distribute sediment to an area of the seabed separated by some distance from the site of bulk sediment removal. Examples of this might be the desire to carry overburden to a site previously dredged to backfill a pit. Another example might be to convey slurry returned from the processing vessel as waste to a desired location for disposal which is remote from the current operating area.

Figure 14:
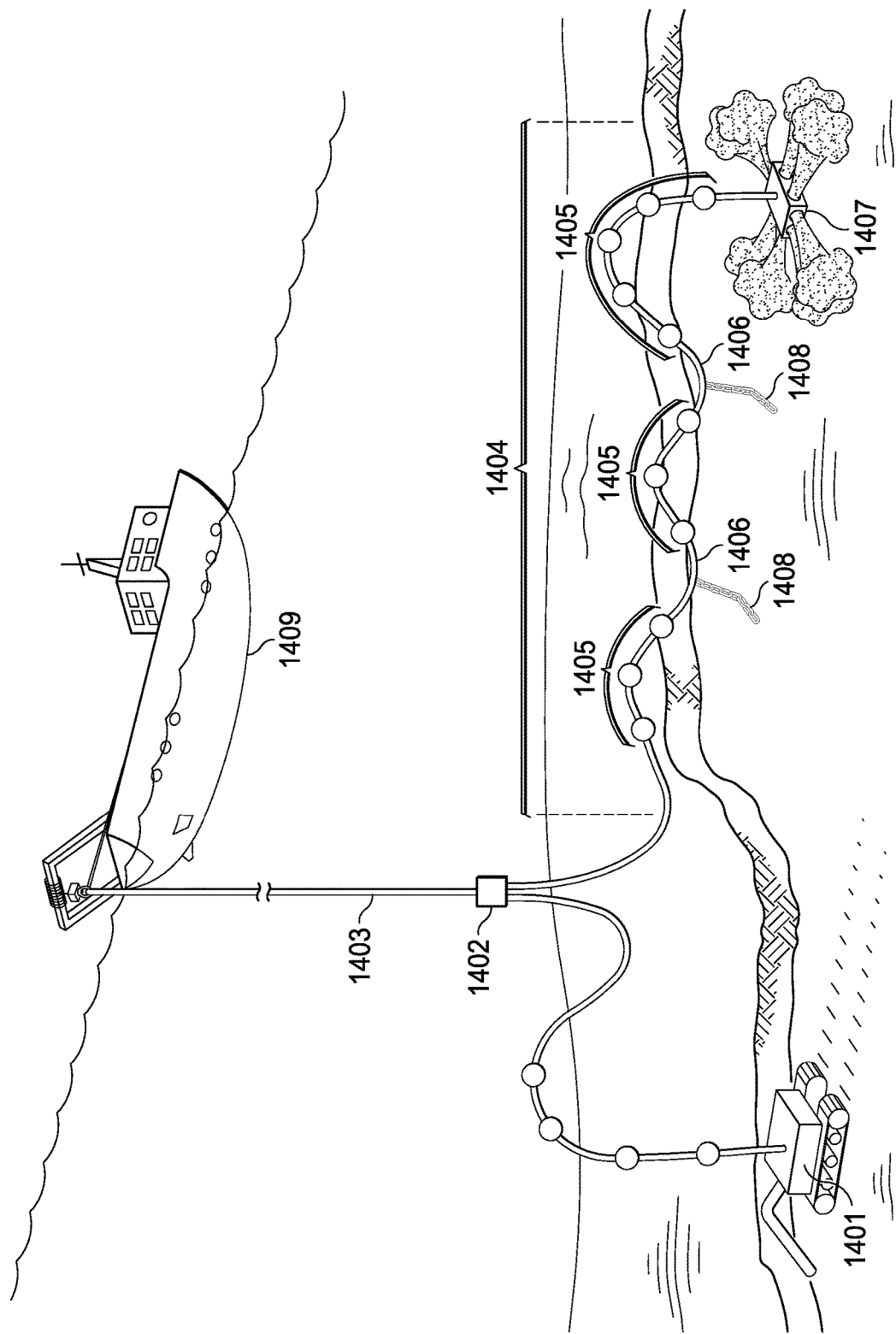
FIG. 14 is a perspective drawing of a bottom founded excavator system using an alternative hose configuration for disposal of overburden.

One example for achieving this is shown in FIG. 14. In this method, the crawler vehicle 1401 is producing slurry which is conveyed to a suspended weight 1402 at the bottom of a cable 1403. The slurry is transferred to another flexible hose 1404 which consists of alternate lengths of buoyant sections 1405 and weighted sections 1406 to create a series of waves in the flexible pipe 1404. A final steep wave is created by attaching the end of the hose 1404 to a bottom fixture 1407. The weighted sections 1406 may consist of a length of chain 1408 attached to the hose 1404. The chain size and length may be selected so that, under conditions when the hose contains water the chain is suspended above the seafloor, or only a short length of chain is on the seafloor. The size and length of chain may be selected so that when the hose is full of the slurry and therefore heavier a certain length of chain will lie on the seabed and the lower sections of the hose will be a certain distance above the seafloor.

With a suitable configuration of the steep wave between the crawler 1401 and the clump weight 1402 on the end of the cable 1403, and suitable control of the surface vessel 1409 position, this configuration would allow the bottom crawler 1401 to cover an extensive area of the seabed 209 while conveying sediment to a fixed location on the seabed. The bottom fixture 1407 at the end of the horizontal wave might serve as a distribution hub with additional flexible hoses distributed to precise locations on the seabed. The position of the fixture 1407 and any distribution network may be adjusted with remotely operated vehicles deployed by the same surface vessel.

In another example the bottom fixture referred to above might consist of process equipment which could, for example, concentrate the slurry prior to lifting to the surface. In another embodiment the bottom fixture might consist of process equipment which could allow removal and extraction of valuable minerals from the sediment without requiring lifting of the sediment to the surface. A riser and lift system may be used to convey the minerals in concentrated form to a separate processing vessel or platform at the surface.

In another embodiment the bottom wave flexible hose 1404 may be connected at one end to the lower end of a riser and lift system 202 which is serving as a conduit for the waste stream from the process vessel. The bottom wave flexible hose 1404 would then convey the waste stream slurry to a designated point for disposal.

Figure 15:
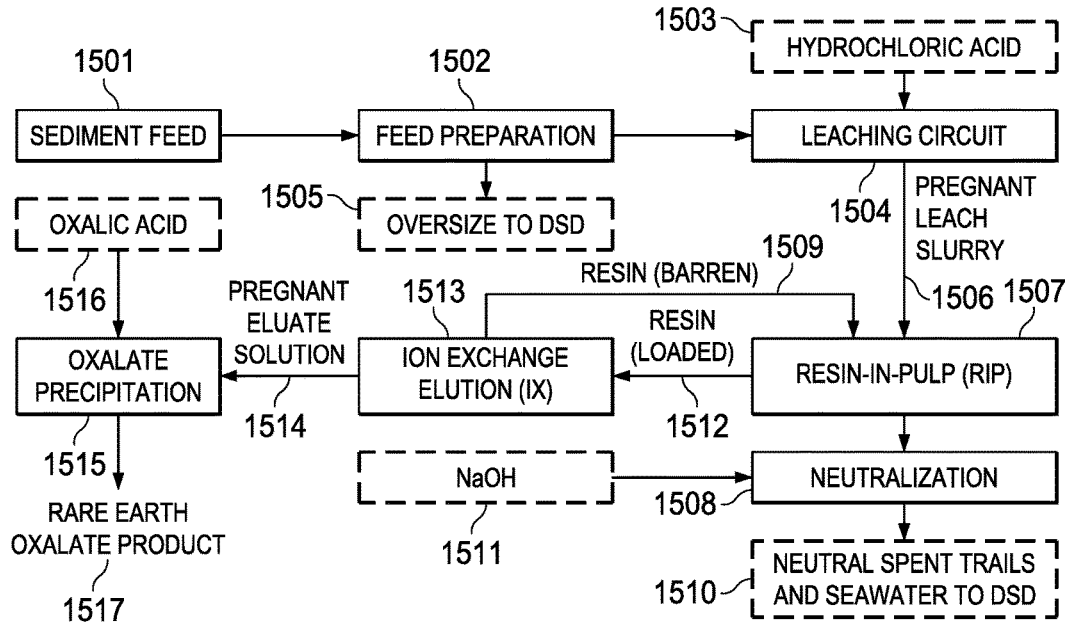
FIG. 15 is a diagram of a shipboard rare earth element processing system.

In some examples, sediment is collected from the sea floor and transported to a processing system on a surface vessel 201 as an ore slurry as described above. An example of a shipboard rare earth element processing system flowsheet is shown in FIG. 15. This example shipboard processing plant treats the sediment ore slurry in a feed preparation circuit/system 1502, a leaching circuit/system 1504, a recovery circuit/system 1507, a residue treatment circuit/system 1508, a resin stripping circuit/system 1513, and a precipitation circuit/system 1515.

Figure 17:
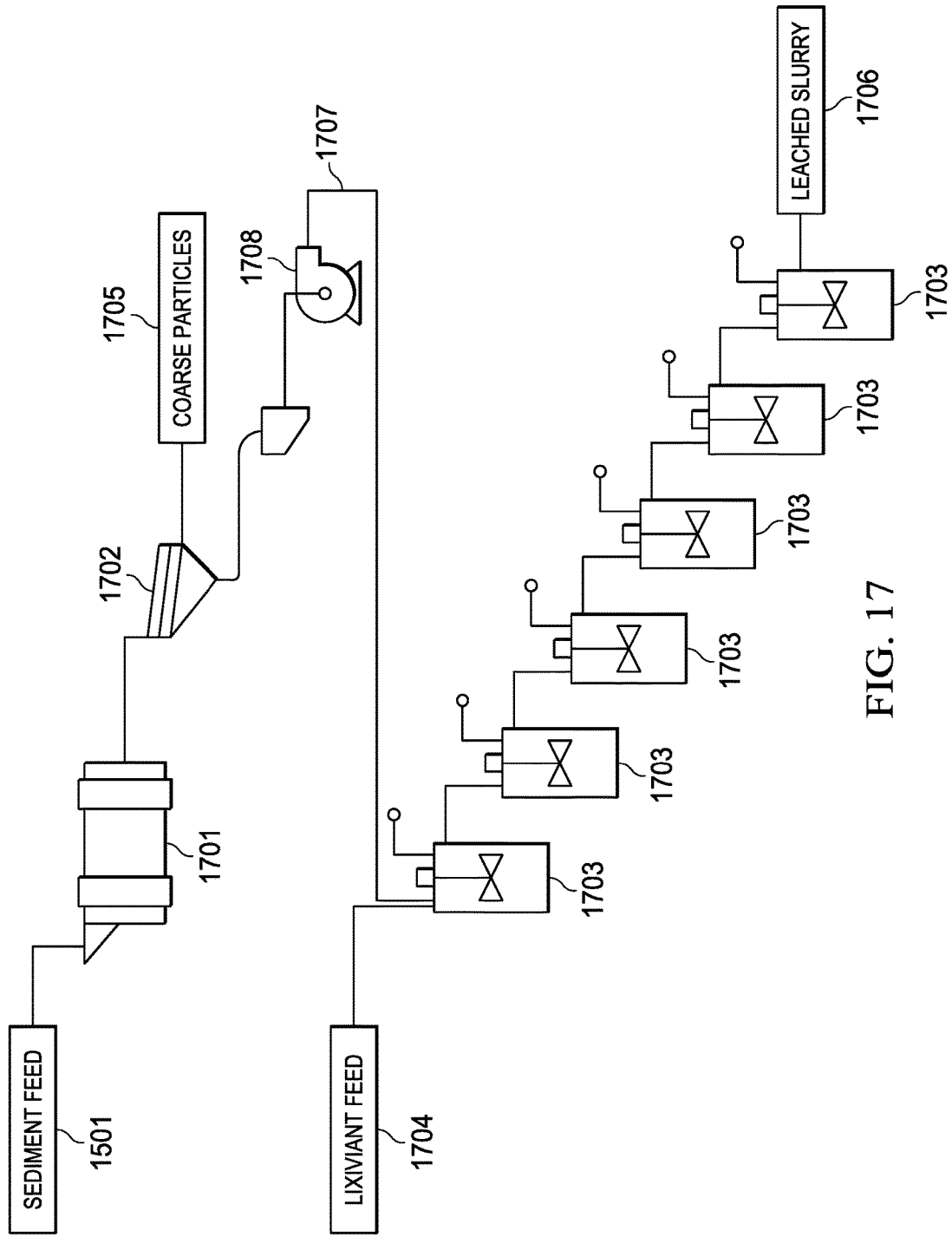
FIG. 17 is a diagram of a feed preparation circuit and a leaching circuit.

FIG. 17 shows example feed preparation and leaching circuits. The first step of preparation is a device to break down any lumps of sediment that may have survived transport from the collection operations and to remove solid particles larger than can be accommodated in subsequent processing. A common machine for this purpose is a horizontal, rotating, cylindrical screen called a rotary washer or trommel 1701. Most of the slurry flows through the screen mesh that makes up the wall of the cylinder, while lumps that are too big to pass through are lifted as the screen turns and dropped back on to the screen, this action coupled with high pressure water sprays is intended to break up the lumps. The trommel 1701 is tilted slightly so lumps that will not break will be discharged from the end of the screen. These surviving lumps will be discarded. The slurry that flows through the screens of the rotary washer will be further classified by size to remove particles larger than about 0.2 mm. These coarse particles 1705 can then be discarded. The common device for this operation would be a vibrating screen 1702. Particles larger than 0.2 mm would tend to settle out of the slurry in downstream processing equipment which would create operation and maintenance problems.

The fine particle prepared ore slurry will flow to a series of leaching tanks 1703 arranged in a leaching circuit where the output of one tank flows into the next tank. The flow can be gravity fed or used in one or more pumps 1708. Several leaching tanks are used to keep the size of each tank reasonable and to ensure that all the particles in the slurry are leached for nearly the same amount of time. Hydrochloric acid, another appropriate lixiviant, or a combination of lixiviant chemicals 1704 is added to the first leach tank 1703 and others as needed to maintain acid strength throughout the leaching process. Maintaining acid strength and maximizing leaching time for all the slurry will ensure the highest level of dissolution (extraction/leaching) of rare earth elements from the sediment.

The slurry in the leach tanks 1703 will be corrosive so they may be lined with and the agitation mechanisms coated with chemically resistant rubber. The primary purpose is to prevent corrosion of the materials of the tanks and agitators, but rubber coatings will also offer abrasion resistance if there are abrasive particles in the sediment. Alternately, leach tanks 1703 may be constructed of stainless steel, fiber reinforced plastic (FRP) or other suitable materials with or without lining as appropriate.

The leach is conducted at the temperature of the slurry, which is likely to be cold. Since temperature is a critical parameter for the kinetics of the leaching and resin loading reactions, it may be desirable to have electrically or steam heated leach vessels 1703 in order to minimize reactor size and required shipboard area, as there is little opportunity for the ore slurry to warm very much above the 2 degrees C. that is expected at the sea floor. Some arrangement is needed to ensure the flow of slurry from tank to tank in the circuit. A common system would have the tanks are arranged to allow gravity flow of slurry from one tank in the series to the next. If necessary, due to limitations on the total amount of drop across all tanks, multiple banks of leach tanks may be set up and the slurry can be transferred from the low tank in one bank to the high tank in the next by pumps.

For shipboard application leach tanks could be installed within the hold of a specially designed process vessel, or in a converted bulk carrier or oil tanker modified for this application. These tanks would not allow gravity flow from one tank to another and a pumping system using special agitation impellers or outside mounted pumps would have to be employed to move the slurry from one tank to another. A pumping system would also allow for flow to be maintained under pitching and rolling of the vessel.

Figure 18:
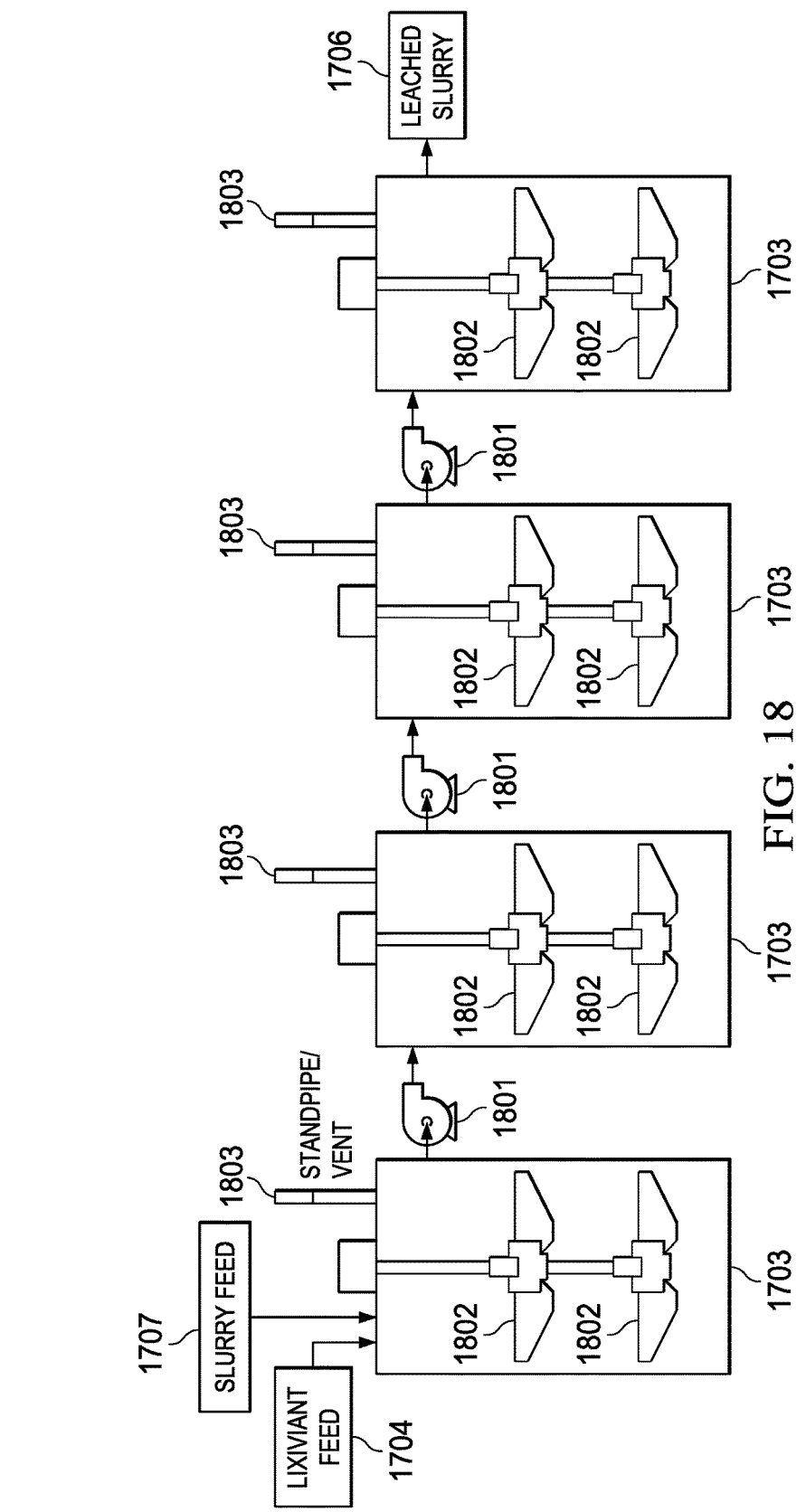
FIG. 18 is a diagram of a leaching circuit.

FIG. 18 shows an example of a series of leaching tanks 1703 with pumps 1801 between the tanks to convey the slurry from one tank to another and agitators 1802. For stability and controlled mixing the leaching tanks on board ship should normally be filled to the top with no free surface. This prevents sloshing of the liquid and is similar to good practice in ballast and liquid cargo tanks on board ships. In order to prevent over pressurization of the tanks standpipes 1803 or vent lines are required. The height of the standpipes will limit the maximum pressure in each tank. There are lixiviant 1704 and prepared ore slurry 1707 feeds into this system and a leached slurry output 1706.

Figure 19:
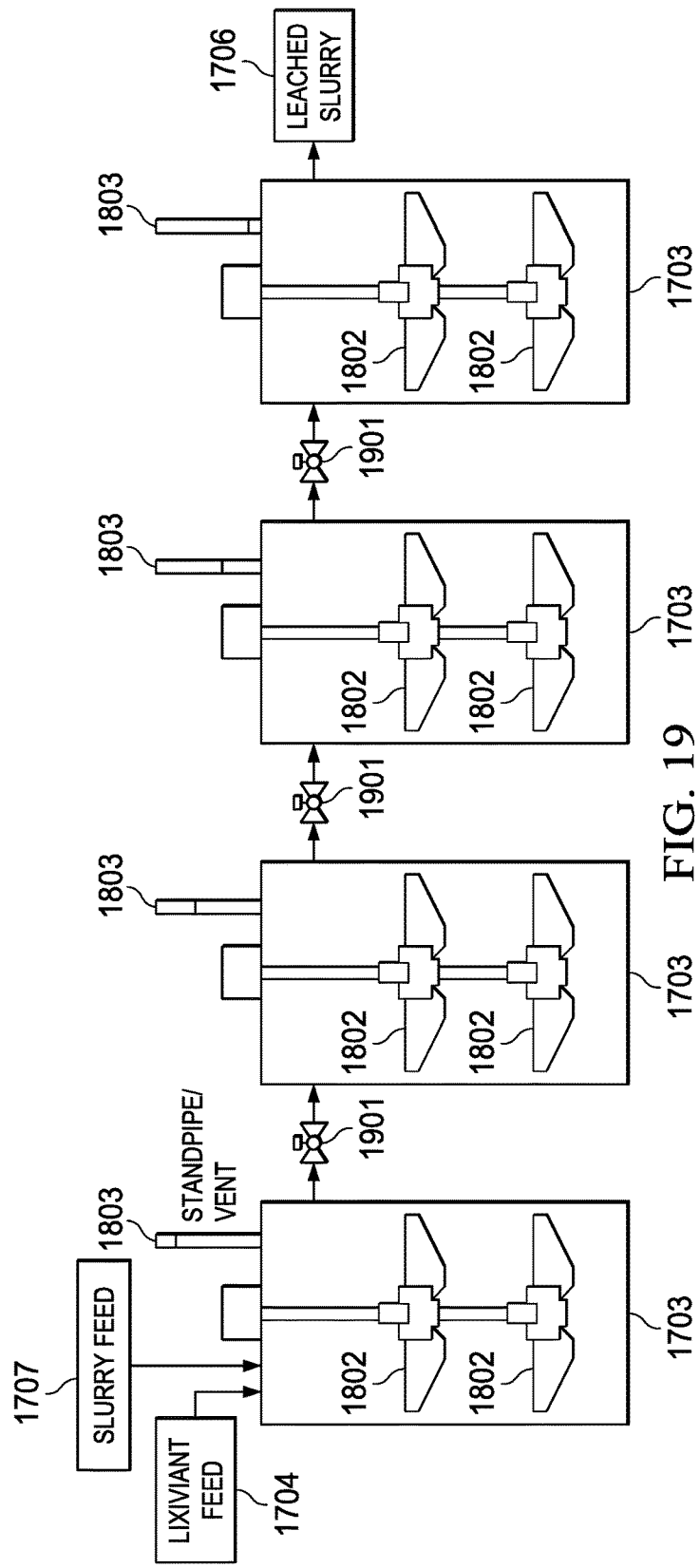
FIG. 19 is a diagram of a leaching circuit.

Another embodiment of a leach tank arrangement is shown in FIG. 19. In this embodiment the tanks are interconnected by slurry valves 1901 which may be adjusted to regulate the flow between tanks. This eliminates the need for separate pumps 1801 between tanks. A slurry feed pump is useful to provide the additional pump pressure to overcome pressure drop in the valves 1901. As seen from the liquid levels in the standpipes 1803 on FIG. 19 the pressure in the first tank is higher than the pressure in the second tank which is higher than the pressure in the third tank etc.

As shown in the example of FIG. 14, leached slurry is pumped to a Resin-In-Pulp recovery system 1507 where the rare earth elements are absorbed from the leach solution by the ion-exchange resin beads. A schematic of an example Resin-in-Pulp (R-I-P) circuit 1507 is illustrated in FIG. 20.

A type of equipment commonly used for the resin-in-pulp circuits is a carousel system using the Pump-Cell™ technology. A Pump-Cell™ is a round mix tank 2001 with a special agitator 2002. The upper portion of the agitator 2002 is surrounded by a screen and inside the screen is a special impeller. A lower impeller agitates the slurry in the tank. The screen keeps the resin beads (which are larger than the largest particle in the ore slurry sediment) in the tank. The upper impeller provides some lift and pumping action which allows the slurry to be transferred to another tank in the circuit that is at the same level. A carousel system is created when several of these tanks (typically 6-10) are arranged with a teed distribution system that allows changes in the flow pattern through the system.

For ship board application the R-I-P tanks could be modified for more convenient packing within the vessel holds. Typical tanks would be square: 8×8 meters and 12 meters high or 10×10 meters and 15 meters high. Also, for ship board operation the tanks would be filled and vented in the same manner as the leach tanks described above. The tanks could also have movable tops to accommodate varying fluid volumes, or tops which float on tank contents to limit free surface effects.

Figure 20:
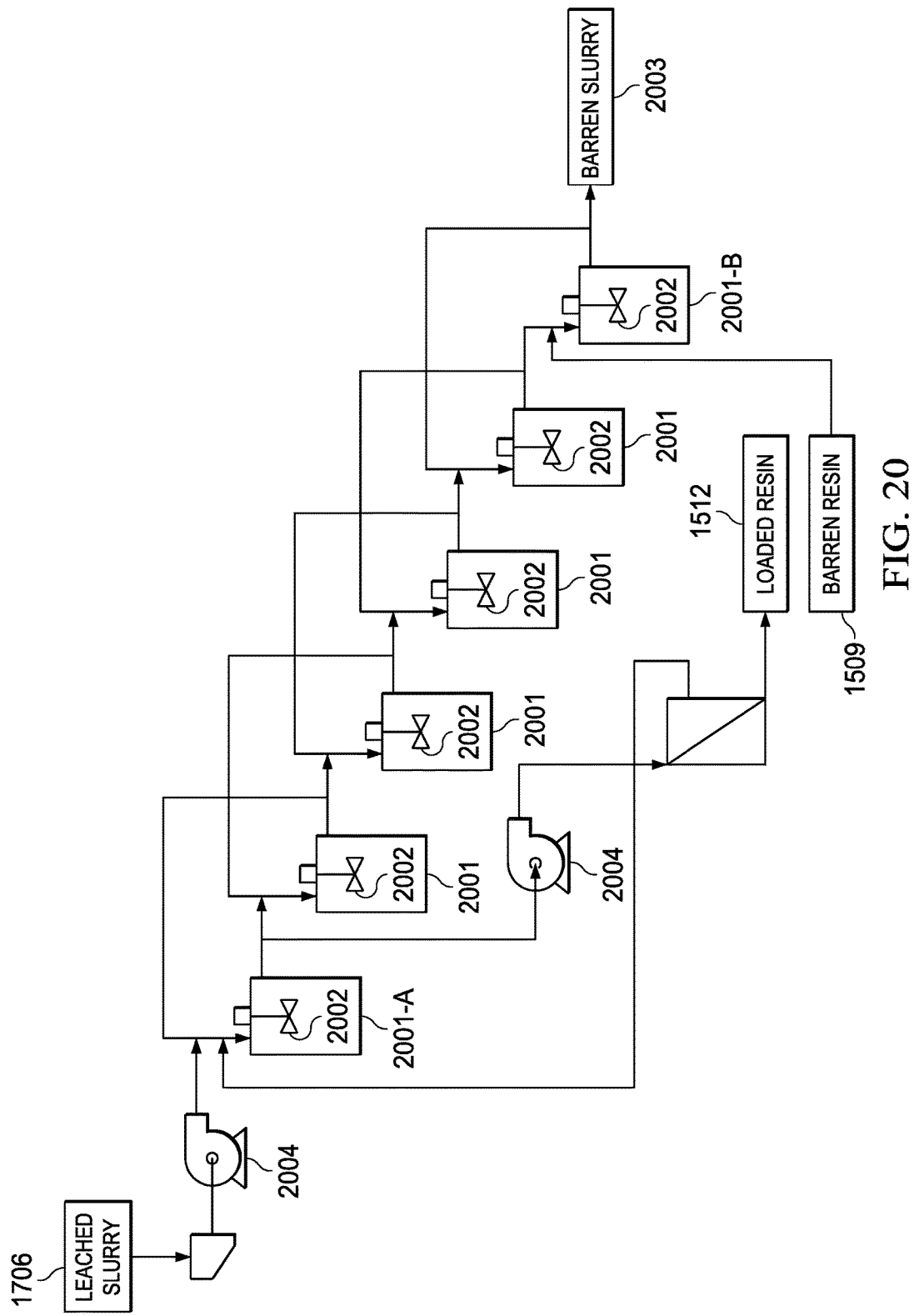
FIG. 20 is a diagram of a recovery circuit.

In the example carousel R-I-P system shown in FIG. 20, the pregnant leach slurry 1706 flows through a succession of resin in pulp tanks 2001. In this example, the pregnant leach slurry 1706 from the leaching circuit 1504 first contacts resin in the first tank 2001-A that is already loaded to near capacity with rare earth elements. The slurry then flows to a tank with a resin that is less loaded and then to a tank with even less loaded resin, etc. The last tank 2001-B the slurry flows through has "fresh" resin that is the most recently stripped. By this counter-current contact, the resin in the first tank 2001-A absorbs the most rare earth elements possible and the resin in the last tank loads the last possible rare earth elements recovering the most rare earth elements from the now barren leached slurry 2003. The slurries and resin can be moved through the resin in pulp system using pumps 2004.

In the example shown in FIG. 15, the barren leached slurry 2003 is transferred from the last R-I-P Pump-Cell™ to a neutralization circuit 1508 where a neutralizing chemical, such as sodium hydroxide when hydrochloric acid is the lixiviant, will be added to neutralize any residual hydrochloric acid. The pH of the neutralized slurry will be matched to that of the local environment. The reaction between sodium hydroxide and hydrochloric acid will produce sodium chloride. This may increase the salinity of the water in the slurry slightly. A flocculant may be added to the slurry which will tend to cause the sediment particles to clump together and settle faster after disposal.

Figure 21:
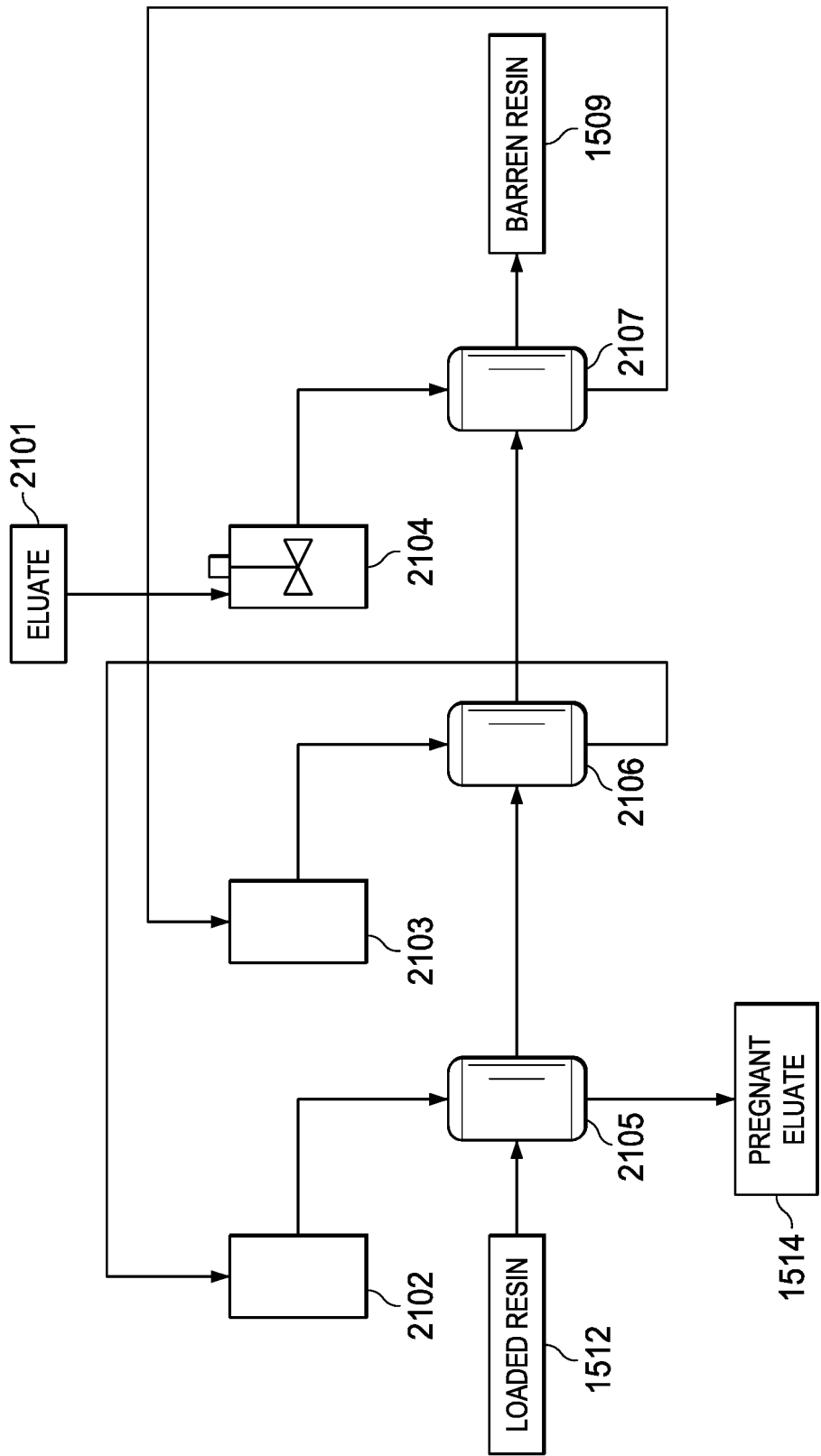
FIG. 21 is a diagram of a resin stripping circuit.

As shown in FIG. 15, the loaded ion-exchange resin beads are transferred from the resin-in-pulp circuit 1507 to an ion exchange elution circuit type recovery/resin stripping circuit 1513. An example resin stripping (elution) system is a batch, pressure down flow type system widely utilized in the uranium industry. In this system a batch of loaded resin 1512 is loaded into a first elution vessel 2105 in slurry form. The vessel 2105 is arranged similar to a sand filter such as used for a swimming pool, but with resin as the bed instead of sand. Once the resin is in place, it will be stripped by pumping stripping fluid (eluant) 2101 downward through the bed of resin. Typically, three batches of eluant are pumped through the resin in series. Again it is typical that each batch of eluant be three times the volume of the total resin bed in the vessel (including void space). Alternatively, the resin stripping could occur in multiple stripping tanks as shown in FIG. 21.

The batches of eluant are fed in a counter-current fashion. The three types of eluant are often described as rich 2102, lean 2103, and fresh 2104. The rich eluant 2102 is used first on the loaded resin from the circuit 1507 in a first resin stripping tank 2105. This removes a portion of the rare earth elements from the resin and makes the rich eluant (which contains some rare earth elements already) even more concentrated. The resulting solution is called pregnant eluant 1514 and is sent to the precipitation circuit 1515. The second stage of stripping is with "lean" eluant 2103, which removes another portion of the rare earth elements from the resin in a second resin stripping tank 2106 and becomes rich eluant 2102. The last stage of stripping uses freshly mixed eluant 2104 in a third resin stripping tank 2107 that removes all the remaining rare earth elements from the resin and becomes lean eluant 2103. The stripped resin 1509 will be rinsed and, if necessary, treated to adjust its chemistry, before being returned to the R-I-P circuit 1507.

The pregnant eluant 1514 is transferred to the precipitation circuit 1515. In the precipitation circuit, the chemistry of the pregnant eluant 1514 can be adjusted to cause the rare earth elements to precipitate. A common practice would be to add oxalic acid which would cause the precipitation of rare earth oxalates. This can be a batch operation or continuous. A solid/liquid separation device or devices, for example a filter press, are necessary to remove the liquid from the rare earth precipitates, which can be packaged in bulk bags and stored for periodic transfer to shore based facilities.

Figure 16:
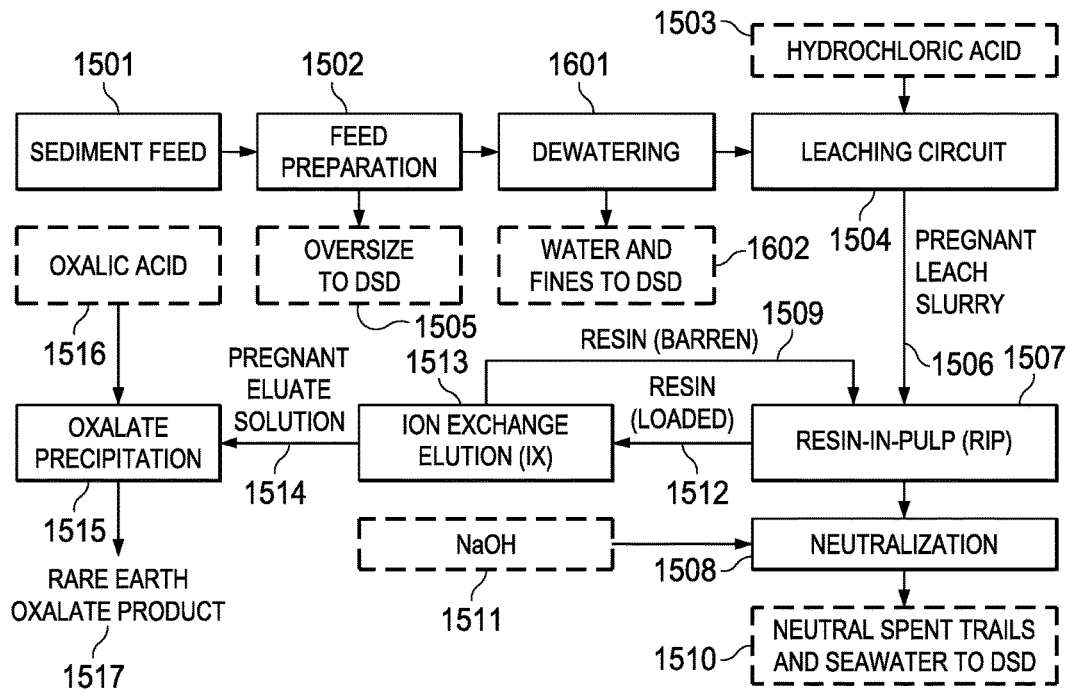
FIG. 16 is a diagram of a shipboard rare earth element processing system.

In another example of shipboard processing, shown in FIG. 16, the prepared ore slurry will be dewatered in a solid/liquid separation system/circuit 1601 after the feed preparation. Dewatering increases the solids concentration in the leach circuit which may reduce the total quantity of reagent needed to achieve a certain concentration of acid in the leach solution. This is typically performed by gravity settling in thickener tanks. As discussed with respect to the other tanks for shipboard processing, these tanks could have fixed tops, movable tops, floating tops, and standpipes to reduce free surface effects. Since thickener tanks may be affected by ship motions, another embodiment would involve a process including hydrocyclones and/or centrifuges to produce a dewatered product. The minerals are most common in particle sizes of a certain range. The dewatering system is adapted to reject particles above a certain material size and below a certain material size. The "cut sizes" are selected to capture the highest percentage of the valuable minerals while achieving a high level of dewatering. Centrifuges can produce a very low moisture content wet material of the proper size distribution. Additional embodiments could use either vacuum or pressure filters.

Dewatering systems typically produce a dewatered product that is too thick (too high in solids concentration) for effective leaching. Therefore, the dewatered product must be diluted to optimum slurry density for leaching. One option for diluting the too thick slurry would be to recycle a portion of the liquid that is removed by the solid/liquid separation system. An alternative would be to dilute the thick slurry with warm surface water, resulting in a warmer prepared ore slurry that would potentially exhibit faster leaching. The dewatering equipment and size sorting equipment can also be placed on the excavator or at the bottom end of the riser.

Figure 22:
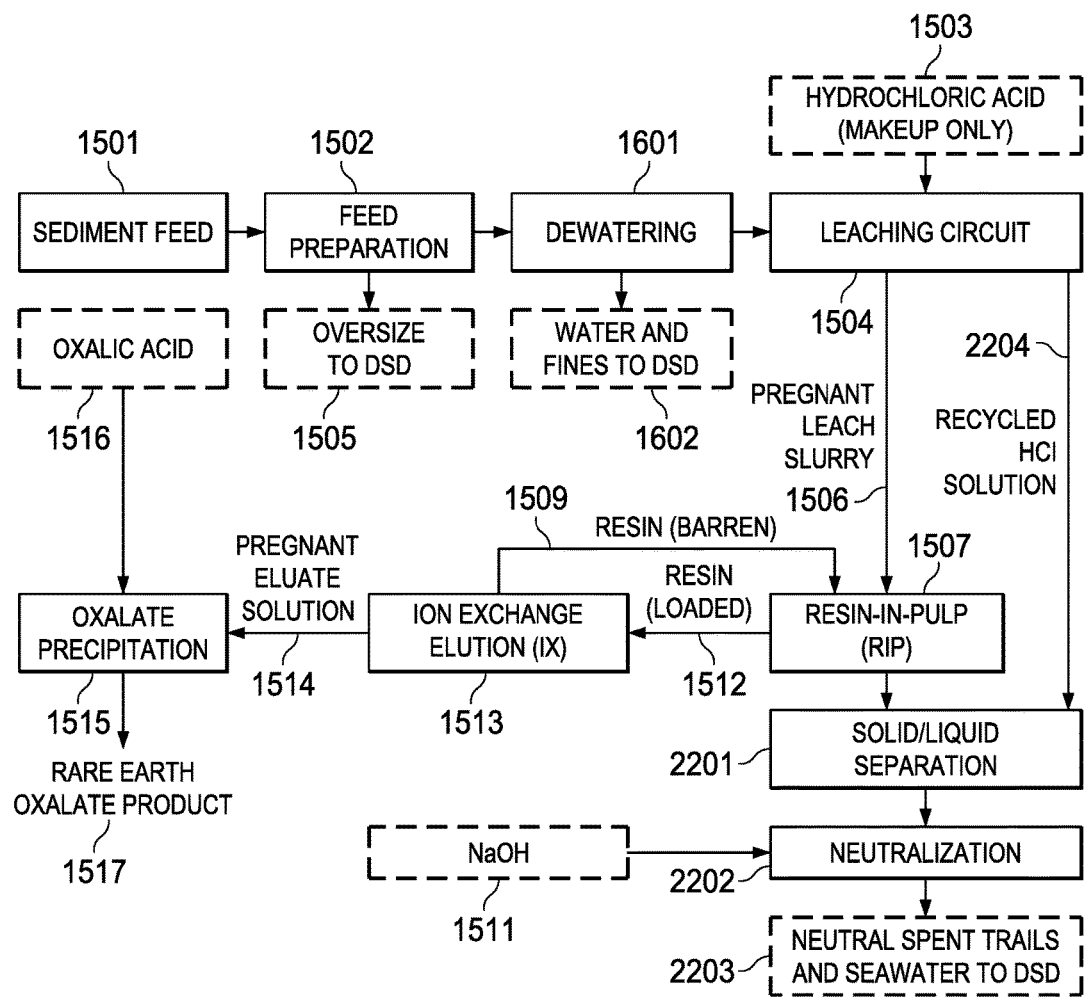
FIG. 22 is a diagram of a shipboard rare earth element processing system.

In another example, shown in FIG. 22, the barren leached slurry is transferred to a dewatering circuit 2202 after a Resin-In-Pulp circuit 1507 to recover lixiviant solution 2204. In this example the recovered lixiviant (leach) solution 2204 is used to dilute the dewatered feed to the leach circuit as described above, thus reducing the amount of acid reagent required. As reagent costs are a major component of the operating cost of this process, this embodiment may have significant benefits to the economics of the process.

An alternative example would be to dewater the leached slurry to produce a clear pregnant liquor/leach solution (i.e. a solution with the desired elements in solution with the solid particles removed) that could be treated by ion-exchange with resins or solvent extraction with liquid solvents to recover the rare earth elements. The leached slurry solids can be washed by systems such as counter-current decantation with gravity thickeners or centrifuges or counter-current filtration with vacuum or pressure filters to recover all the dissolved valuable materials. In this example, the residual leached solids could be produced as a thick slurry which may be desirable for disposal with less environmental impact. A portion of the barren leach liquor could be recycled to the start of the leaching circuit as described above, but it will be relatively dilute due to the addition of wash water in the washing circuit.

If dewatering after treatment or before some other system for recovering rare earth elements from a clear solution is used, dilution of the leach liquor and/or the presence of deleterious elements may make an acid recovery system necessary for maximum reagent conservation. Hydrochloric acid may be recovered from a dilute solution and upgraded in strength and purity by systems based on ion-exchange or solvent extraction. Distillation systems may also provide a path to upgrade and purify the hydrochloric acid for re-use.

Additionally, phosphates may be recovered from the ore slurry using a combination of ion exchange and solvent extraction. Phosphoric acid will be produced when an acid is used as the lixiviant to liberate the rare earth elements. The phosphate bearing mineral apatite is known to be present in the sediments containing significant quantities of rare earth elements. Acids will react with the apatite to produce phosphoric acid.

A primary ion exchange system using an appropriate ion exchange resin (in beads) would be used to treat either the leach slurry or clear leach solution to recover the phosphoric acid in a fashion similar to that used to recover the rare earth elements. It is likely that additional stages of ion exchange and solvent extraction would be necessary to produce a phosphoric acid product that would have a market. An intermediate product may be produced on the ship with subsequent stages of upgrading being carried out at a shore based facility.

What is claimed is:

1. A system for recovering desired materials from the seabed comprising:
    a surface vessel;
    an excavator on the seabed adapted to generate an ore slurry containing a desired material from the seabed;
    a lift system connected to the excavator and the surface vessel, the lift system adapted to convey the ore slurry from the from the excavator to a lift system output on the surface vessel;
    a feed preparation circuit on the surface vessel and connected to the lift system output, the feed preparation circuit adapted to process the ore slurry to produce a prepared ore slurry consisting essentially of seawater and solid particles within a desired size range;
    a leaching circuit on the surface vessel and connected to the feed preparation circuit, the leaching circuit adapted to dissolve the desired material from the ore slurry using a lixiviant to produce a pregnant leach slurry;
    a recovery circuit on the surface vessel and connected to the leaching circuit, the recovery circuit adapted to recover the desired material from the pregnant leach slurry using an ion exchange resin to produce a loaded resin and a leach waste material;
    a residue treatment circuit on the surface vessel and connected to the recovery circuit, the residue treatment circuit adapted to neutralize the leach waste material;
    a resin stripping circuit on the surface vessel and connected to the recovery circuit, the resin stripping circuit adapted to adapted to strip the desired materials from the loaded resin using an eluant to produce a pregnant eluant and a stripped resin;
    a precipitation circuit on the surface vessel and connected to the resin stripping circuit; the precipitation circuit adapted to precipitate the desired material from the pregnant eluant using a precipitant to produce the desired material and a barren eluant.

2. The system for recovering desired materials from the seabed of claim 1 further comprising:
    a lixiviant recycling circuit on the surface vessel and connected to the recovery circuit, the lixiviant recycling circuit adapted to remove solid waste materials from the leach waste material to produce a barren leach solution and a thickened leach waste material;
    wherein the barren leach solution is reused in the leaching circuit and the thickened waste material is fed to the residue treatment circuit and wherein substantially all of the stripped resin is reused as the ion exchange resin in the recovery circuit.

3. The system for recovering desired materials from the seabed of claim 2 wherein the feed preparation circuit further comprises a dewatering circuit adapted to remove excess water and fine particulates from the prepared ore slurry.

4. The system for recovering desired materials from the seabed of claim 2 further comprising a dewatering circuit on the excavator; and
    a subsea feed preparation circuit on the excavator, the subsea feed preparation circuit adapted to process the ore slurry to produce a prepared ore slurry consisting essentially of seawater and solid particles within a desired size range.

5. The system for recovering desired materials from the seabed of claim 2 wherein the leaching circuit further comprises:
    a series of leaching tanks arranged so that the prepared ore solution can move from one leaching tank to the next from a first leaching tank to a last leaching tank; and
    agitators in the series of leaching tanks.

6. The system recovering desired materials the seabed of claim 5 wherein the leaching tanks have baffles adapted to reduce free surface effects.

7. The system for recovering desired materials from the seabed of claim 5 wherein the leaching tanks have movable tops adapted to limit free surface effects by floating on the tank contents.

8. The system for recovering desired materials from the seabed of claim 2 wherein the lixiviant is a mineral acid.

9. The system for recovering desired materials from the seabed of claim 2 wherein the lixiviant is an organic acid.

10. The system for recovering desired materials from the seabed of claim 2 wherein the lixiviant is a combination of a mineral acid and an organic acid.

11. The system for recovering desired materials from the seabed of claim 2 wherein the ion exchange resin comprises resin beads larger than the substantially all of the particles in the pregnant leach slurry, and the recovery circuit comprises:
    a series of resin contact tanks arranged so that the pregnant leach slug can move from one resin contact tank to the next from a first resin contact tank to a last resin contact tank;
    agitators in the series of resin contact tanks.

12. The system for recovering desired materials from the seabed of claim 11 wherein the recovery circuit comprises a resin in pulp system.

13. The system for recovering desired materials from the seabed of claim 11 wherein the loaded resin and leach waste material are mechanically separated.

14. The system for recovering desired materials from the seabed of claim 11 wherein the loaded resin and leach waste material are separated using a screen.

15. The system for recovering desired materials from the seated of claim 2 wherein the residue treatment circuit further comprises:

a series of residue treatment tanks arranged so that the leach waste material can move from one residue treatment tank to the next from a first residue treatment tank to a last residue treatment tank;

a residue treatment injector adapted to add a residue treatment agent to the series of residue treatment tanks;

agitators in the series of residue treatment tanks.

16. The system for recovering desired materials from the seabed of claim 2 wherein the resin stripping circuit further comprises:

a series of stripping tanks arranged so that the eluant can move from one stripping tank to the next from a first stripping tank to a last stripping tank; and agitators in the series of stripping tanks.

17. The system for recovering desired materials from the seabed of claim 2 wherein the precipitation circuit further comprises a dewatering system to separate the desired material from the barren eluant.

18. The system for recovering desired materials from the seabed of claim 2 wherein the precipitant is oxalic acid.

19. The system for recovering desired materials from the seabed of claim 2 wherein the precipitant is sodium carbonate.

* * * * *